United States Patent
Shimizu et al.

(10) Patent No.: US 11,166,223 B2
(45) Date of Patent: Nov. 2, 2021

(54) WIRELESS COMMUNICATION SYSTEM, MANAGEMENT DEVICE, AND COMMUNICATION PATH SWITCHING METHOD

(71) Applicant: PANASONIC CORPORATION, Osaka (JP)

(72) Inventors: Noriyuki Shimizu, Kanagawa (JP); Hiroaki Asano, Kanagawa (JP); Hideki Shingu, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 352 days.

(21) Appl. No.: 16/473,515

(22) PCT Filed: Feb. 28, 2017

(86) PCT No.: PCT/JP2017/007959
§ 371 (c)(1),
(2) Date: Jun. 25, 2019

(87) PCT Pub. No.: WO2018/123084
PCT Pub. Date: Jul. 5, 2018

(65) Prior Publication Data
US 2021/0306932 A1      Sep. 30, 2021

(30) Foreign Application Priority Data

Dec. 27, 2016  (JP) .............................. JP2016-254244

(51) Int. Cl.
*H04W 4/00*       (2018.01)
*H04W 40/36*      (2009.01)
(Continued)

(52) U.S. Cl.
CPC ........... *H04W 40/36* (2013.01); *H04W 24/04* (2013.01); *H04W 36/08* (2013.01); *H04W 36/30* (2013.01)

(58) Field of Classification Search
None
See application file for complete search history.

(56) References Cited

U.S. PATENT DOCUMENTS

2011/0170466 A1    7/2011    Kwun
2013/0310040 A1    11/2013   Kwun
(Continued)

FOREIGN PATENT DOCUMENTS

JP    2004-180216    6/2004
JP    2009-206764    9/2009
(Continued)

OTHER PUBLICATIONS

International Search Report issued in International Patent Application No. PCT/JP2017/007959, dated May 23, 2017, along with English translation.

*Primary Examiner* — Suhail Khan
(74) *Attorney, Agent, or Firm* — Greenblum & Bernstein, P.L.C.

(57) ABSTRACT

To reduce power consumption and enable a quick change from one communication path to another when detecting a decrease in quality of communication for communicating user data, a first base station determines a second base station and a third base station, and then the first base station transmits a connection request message to a terminal, the second base station and the third base station concurrently with transmitting a communication request message to the second base station, and, while the second base station is in communication with the terminal, upon detecting a decrease in quality of communication with the terminal based on a reception status of an uplink signal from the terminal, the (Continued)

second base station transmits a path switching request message to the first base station, which in turn transfers the received path switching request message transmitted from the second base station to the third base station.

12 Claims, 19 Drawing Sheets

(51) Int. Cl.
*H04W 24/04* (2009.01)
*H04W 36/08* (2009.01)
*H04W 36/30* (2009.01)

(56) References Cited

U.S. PATENT DOCUMENTS

| | | | |
|---|---|---|---|
| 2014/0084874 A1* | 3/2014 | Eger | ........................ H02J 3/144 320/137 |
| 2015/0223135 A1 | 8/2015 | Ratasuk et al. | |
| 2020/0329408 A1* | 10/2020 | Selvaganapathy | .... H04L 45/306 |

FOREIGN PATENT DOCUMENTS

| | | |
|---|---|---|
| JP | 2013-516884 | 5/2013 |
| JP | 2016-171497 | 9/2016 |
| WO | 2014/024001 | 2/2014 |

\* cited by examiner

*Fig.5* connection state management table

| terminal ID | MeNB | SeNB | TeNB | C-Plane | main U-Plane | backup U-Plane |
|---|---|---|---|---|---|---|
| A | Cell ID 0 | Cell ID 4 | Cell ID 10 | MeNB | SeNB | TeNB |
| B | Cell ID 0 | Cell ID 14 | none | MeNB | SeNB | none |
| C | Cell ID 1 | Cell ID 4 | Cell ID 9 | MeNB | TeNB | SeNB |

Fig.17
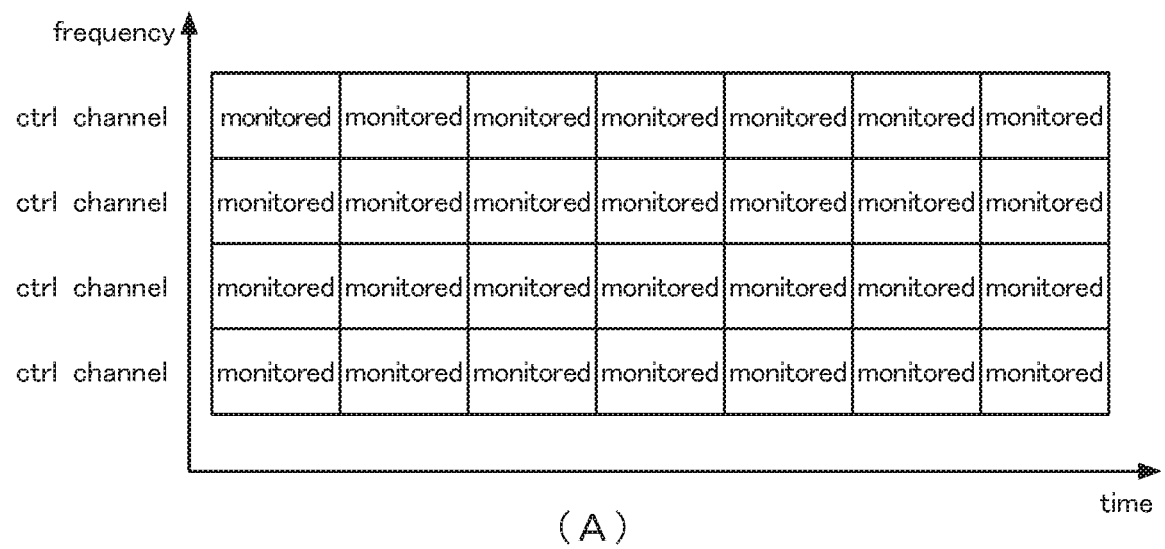
(A)
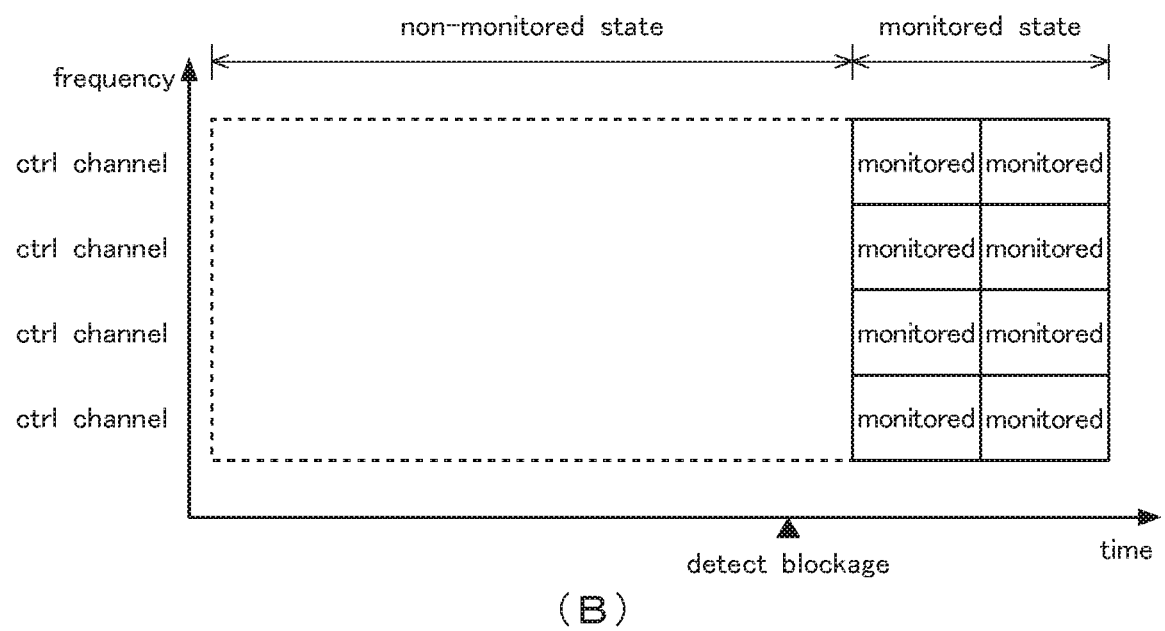
(B)

Fig.18
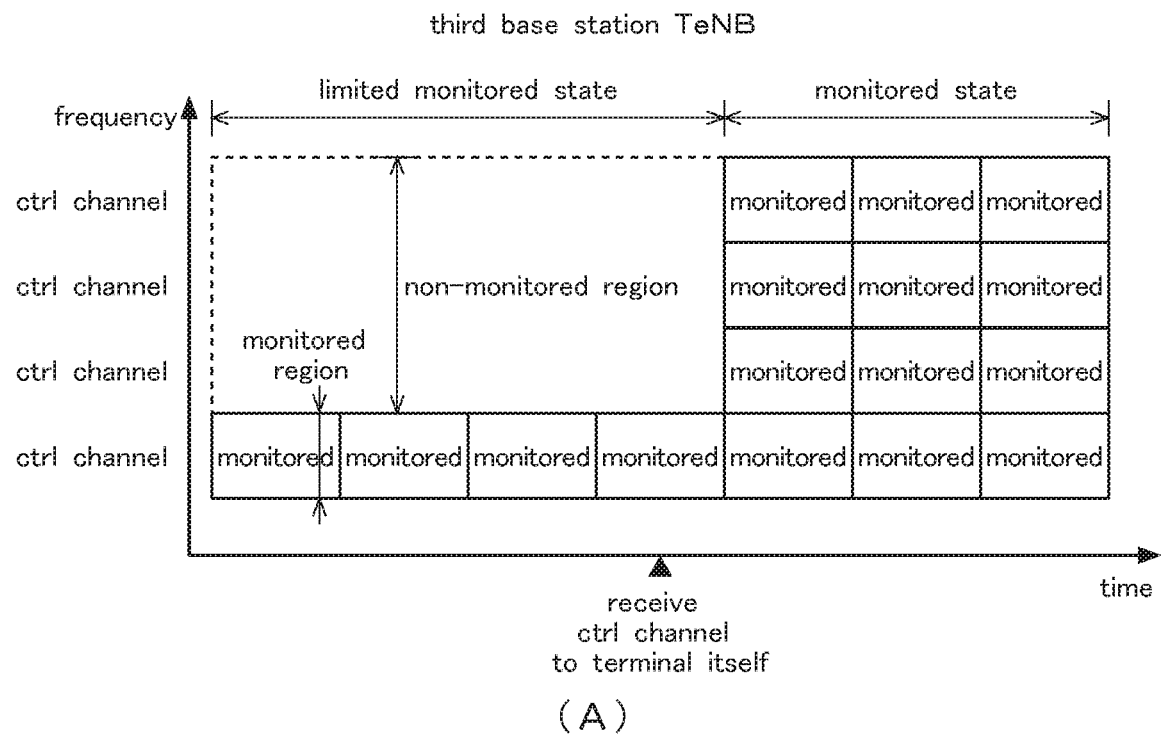
(A)
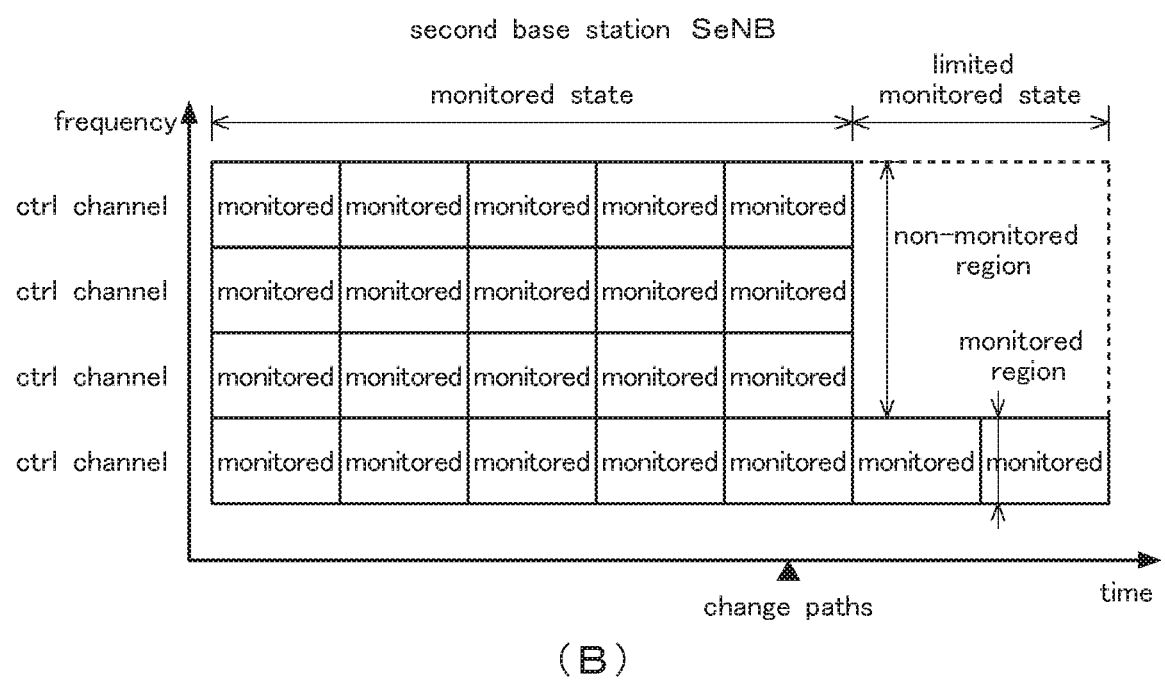
(B)

WIRELESS COMMUNICATION SYSTEM, MANAGEMENT DEVICE, AND COMMUNICATION PATH SWITCHING METHOD

TECHNICAL FIELD

The present invention relates to a wireless communication system for communicating user data between a terminal device and a superordinate network via base station devices configured for wireless communication with the terminal device, a management device for managing a terminal device and base station devices in the system, and a communication path switching method in the system.

BACKGROUND ART

In recent years, studies in the field of mobile communication have been proceeding with advanced considerations in relation to 5G systems (5th generation mobile communication system). Such 5G systems are supposed to utilize high frequency bands such as high SHF (Super High Frequency) band and EHF (Extremely High Frequency) band. Since radio waves in these frequency bands have a tendency to travel in a straight line; that is, generally propagate by line of sight, there is a problem that radio waves are blocked by an obstacle in their propagation path, resulting in a significant decrease in quality of communication.

Examples of known techniques for addressing the problem of a decrease in quality of communication by a blockage include establishment of wireless connections to multiple base stations so as to form multiple wireless communication paths for communicating user data. (See Patent Document 1)

PRIOR ART DOCUMENT (S)

Patent Document(s)

Patent Document 1: JP2016-171497A

SUMMARY OF THE INVENTION

Task to be Accomplished by the Invention

In the above-mentioned prior art, since a terminal can simultaneously communicate with multiple base stations, quality of communication can be stabilized. However, in the technology, a terminal needs to constantly monitor all control channels to multiple base stations to detect user data transmitted to the terminal itself, which inconveniently increases power consumption at the terminal. Furthermore, in the above prior art, multiple base stations transmit the same packet data to a terminal in order to maintain communications with the terminal, which results in a decrease in frequency utilization efficiency.

Another possible approach is to switch from one communication path to another upon detecting a decrease in quality of communication. In this case, when it takes a longer time to switch communication paths, users tend to experience a decrease in quality of communication, such as interruption of video streaming and massive extension of download time. Thus, there is a need for technology to switch communication paths in a quick and proper manner.

The present invention has been made in view of such problems of the prior art, and a primary object of the present invention is to provide a wireless communication system, a management device, and a communication path switching method, which reduces power consumption at a terminal and enables a quick change from one communication path to another upon detecting a decrease in quality of communication for communicating user data.

Means to Accomplish the Task

An aspect of the present invention provides a wireless communication system for communicating user data between a terminal device and a superordinate network via base station devices configured for wireless communication with the terminal device, comprising:
the terminal device;
the base station devices including a main base station device which serves as a normal communication path for the user data, and a backup base station device which serves as a backup communication path for the user data;
a management device configured to manage the terminal device and the base station devices;
wherein the management device comprises:
a management communication device configured to communicate with the terminal device and the base station devices; and
a management controller configured to determine the main base station device and the backup base station device, and transmit a connection request message to the terminal device, the main base station device, and the backup base station device concurrently with transmitting a communication request message to the main base station device, wherein, upon receiving a path switching request message from the main base station device, the management controller transfers the received path switching request message to the backup base station device,
wherein each of the base station devices comprises:
a base station communication device configured to communicate with the terminal device and the management device; and
a base station controller configured to control connection and communication with the terminal device in response to the connection request message and/or the communication request message transmitted from the management device, wherein, upon detecting a decrease in quality of communication with the terminal device, the base station controller transmits the path switching request message to the management device, and
the terminal device comprises:
a terminal communication device configured to communicate with the management device and the base station devices; and
a terminal controller configured to control connection and communication with the base station devices in response to the connection request message transmitted from the management device.

Another aspect of the present invention provides a management device for managing a terminal device and base station devices, each base station device being configuring for wireless communication with the terminal device and the management device, the management device comprising:
a management communication device configured to communicate with the terminal device and the base station devices; and
a management controller configured to determine, among the base station devices, a main base station device which serves as a normal communication path, and a backup base station device which serves as a backup communication path, and to transmit a connection request message to the terminal device, the main base station device, and the backup base station device concurrently with transmitting a communication request message to the main base station device, wherein the main base station device transmits a path switching request message when a decrease in quality of communication occurs, and wherein the management controller, upon receiving the path switching request message from the main base station device, transfers the received path switching request message to the backup base station device.

Yet another aspect of the present invention provides a communication path switching method for switching base station devices used for wireless communication with a terminal device, the method using a management device configured to manage the terminal device and the base station devices, the method comprising:

the management device determining, among the base station devices, a main base station device which serves as a normal communication path, and a backup base station device which serves as a backup communication path; and the management device transmitting a connection request message to the terminal device, the main base station device, and the backup base station device concurrently with transmitting a communication request message to the main base station device;

the main base station device and the backup base station device each completing establishment of a connection with the terminal device in response to the connection request message and/or the communication request message transmitted from the management device;

the main base station device, upon detecting a decrease in quality of communication with the terminal device; transmitting a path switching request message to the management device; and the management device, upon receiving the path switching request message transmitted from the main base station device, transferring the received path switching request message to the backup base station device.

Effect of the Invention

According to the present invention, since a terminal is connected in advance to both a base station device serving as a normal communication path and a base station device serving as a backup communication path, when quality of communication is decreased so that a change in communication paths becomes necessary, the terminal can quickly switch a communication path from the base station device serving as the normal communication path to the base station device serving as the backup communication path. In addition, since the base station device serving as the backup communication path is connected to the terminal in advance, but does not start communication with the terminal immediately after establishment of the connection, power consumption at the terminal is reduced. Furthermore, since a path switching request message is transferred to the base station device serving as the backup communication path via a management device, each base station device does not need to manage its connection state, which means each base station device can be simplified in design configuration.

BRIEF DESCRIPTION OF THE DRAWINGS

FIG. 5 is an explanatory view showing an example of a connection state management table;

FIG. 17 is an explanatory view showing how the terminal 1 monitors communication channels according to the fourth embodiment of the present invention;

FIG. 18 is an explanatory view showing how the terminal 1 monitors communication channels according to a fifth embodiment of the present invention.

DESCRIPTION OF THE PREFERRED EMBODIMENT(S)

Figure 1:
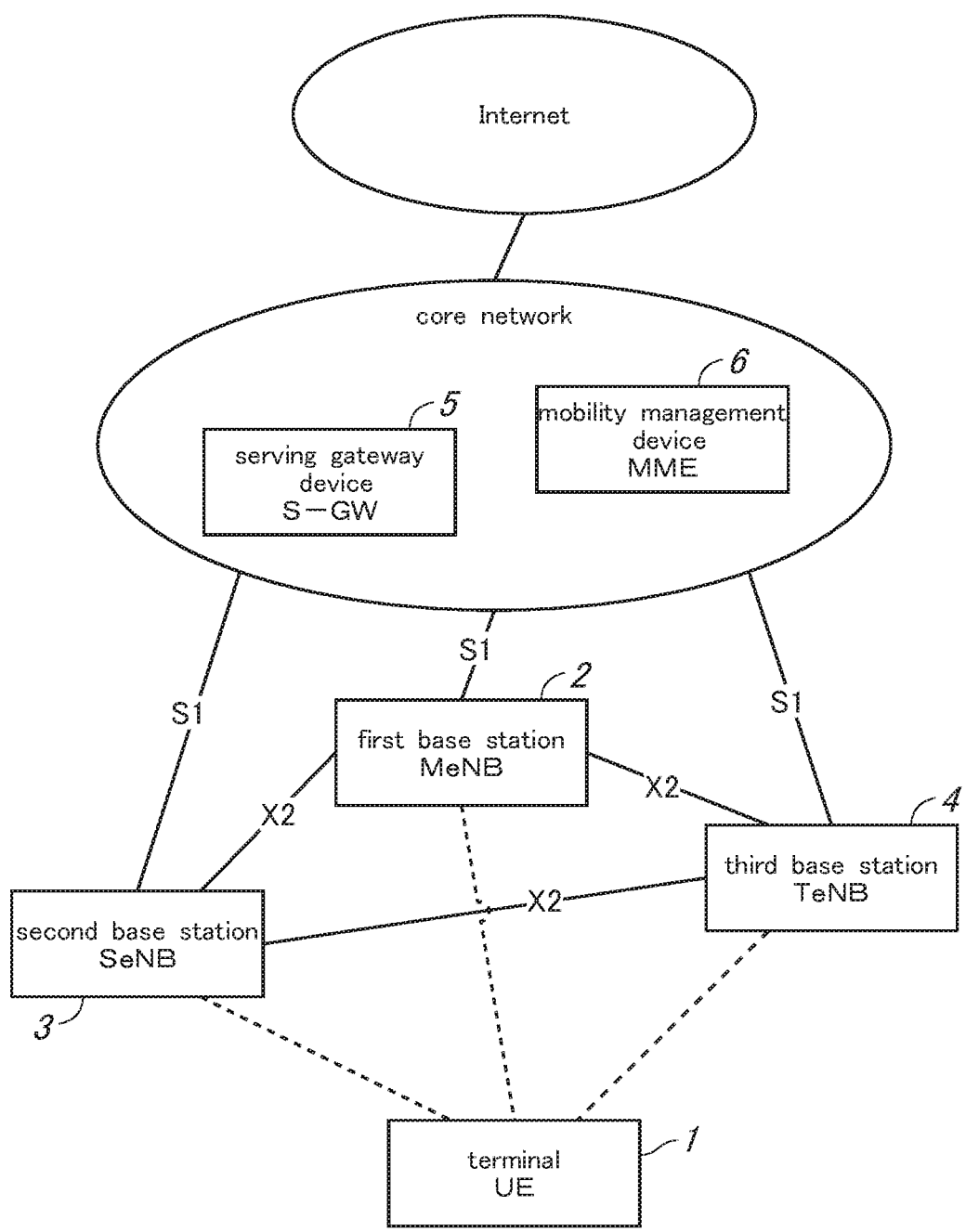
FIG. 1 is a diagram showing a general configuration of a wireless communication system according to a first embodiment of the present invention.

A first aspect of the present invention made to achieve the above-described object is a wireless communication system for communicating user data between a terminal device and a superordinate network via base station devices configured for wireless communication with the terminal device, comprising:

the terminal device;

the base station devices including a main base station device which serves as a normal communication path for the user data, and a backup base station device which serves as a backup communication path for the user data;

a management device configured to manage the terminal device and the base station devices;

wherein the management device comprises:

a management communication device configured to communicate with the terminal device and the base station devices; and a management controller configured to determine the main base station device and the backup base station device, and transmit a connection request message to the terminal device, the main base station device, and the backup base station device concurrently with transmitting a communication request message to the main base station device, wherein, upon receiving a path switching request message from the main base station device, the management controller transfers the received path switching request message to the backup base station device, wherein each of the base station devices comprises:

a base station communication device configured to communicate with the terminal device and the management device; and a base station controller configured to control connection and communication with the terminal device in response to the connection request message and/or the communication request message transmitted from the management device, wherein, upon detecting a decrease in quality of communication with the terminal device, the base station controller transmits the path switching request message to the management device, and the terminal device comprises:

a terminal communication device configured to communicate with the management device and the base station devices; and a terminal controller configured to control connection and communication with the base station devices in response to the connection request message transmitted from the management device.

In this configuration, since a terminal is connected in advance to both a base station device serving as a normal communication path and a base station device serving as a backup communication path, when quality of communication is decreased so that a change in communication paths becomes necessary, the terminal can quickly switch a communication path from the base station device serving as the normal communication path to the base station device serving as the backup communication path. In addition, since the base station device serving as the backup communication path is connected to the terminal in advance, but does not start communication with the terminal immediately after establishment of the connection, power consumption at the terminal is reduced. Furthermore, since a path switching request message is transferred to the base station device serving as the backup communication path via a management device, each base station device does not need to manage its connection state, which means each base station device can be simplified in design configuration.

A second aspect of the present invention is a wireless communication system for communicating user data between a terminal device and a superordinate network via base station devices configured for wireless communication with the terminal device, comprising:

the terminal device;

the base station devices including a main base station device which serves as a normal communication path for the user data, and a backup base station device which serves as a backup communication path for the user data;

a management device configured to manage the terminal device and the base station devices;

wherein the management device comprises:

a management communication device configured to communicate with the terminal device and the base station devices; and a management controller configured to determine the main base station device and the backup base station device, and transmit a connection request message to the terminal device, the main base station device, and the backup base station device concurrently with transmitting a communication request message to the main base station, wherein each of the base station devices comprises:

a base station communication device configured to communicate with the terminal device and the management device; and a base station controller configured to control connection and communication with the terminal device in response to the connection request message and/or the communication request message transmitted from the management device, wherein, upon detecting a decrease in quality of communication with the terminal device, the base station controller transmits the path switching request message to the backup base station device, and the terminal device comprises:

a terminal communication device configured to communicate with the management device and the base station devices; and a terminal controller configured to control connection and communication with the base station devices in response to the connection request message transmitted from the management device.

This configuration reduces power consumption at a terminal and enables a quick change from one communication path to another when detecting a decrease in quality of communication for communicating user data in the same manner as the first aspect of the present invention. Furthermore, since a base station device serving as a normal communication path transmits a path switching request message directly to a backup base station device, which reduces time required to switch communication paths.

A third aspect of the present invention is a wireless communication system for communicating user data between a terminal device and a superordinate network via base station devices configured for wireless communication with the terminal device, comprising:

the terminal device;

the base station devices including a main base station device which serves as a normal communication path for the user data, and a backup base station device which serves as a backup communication path for the user data;

a management device configured to manage the terminal device and the base station devices;

wherein the management device comprises:

a management communication device configured to communicate with the terminal device and the base station devices; and a management controller configured to determine the main base station device and the backup base station device, and transmit a connection request message to the terminal device, the main base station device, and the backup base station device concurrently with transmitting a communication request message to the main base station device, wherein, upon detecting a decrease in quality of communication with the terminal device, the management controller transmits a path switching request message to the backup base station device, wherein each of the base station devices comprises:

a base station communication device configured to communicate with the terminal device and the management device; and a base station controller configured to control connection and communication with the terminal device in response to the connection request message and/or the communication request message transmitted from the management device, and wherein the terminal device comprises:

a terminal communication device configured to communicate with the management device and the base station devices; and a terminal controller configured to control connection and communication with the base station devices in response to the connection request message transmitted from the management device.

In this configuration, power consumption at the terminal is reduced, and when quality of communication is decreased so that a change in communication paths becomes necessary, the terminal can quickly switch from a current communication path to another. Furthermore, since a management device detects a decrease in quality of communication, each base station device does not need to be equipped with a feature to detect a decrease in quality of communication, which means each base station device can be simplified in design configuration.

A fourth aspect of the present invention is the wireless communication system of the first aspect, wherein when the base station device serves as the main base station device and is in communication with the terminal device, the base station device detects the decrease in quality of communication based on a reception status of an uplink signal from the terminal device.

A fifth aspect of the present invention is the wireless communication system of the third aspect, wherein the management device detects the decrease in quality of communication based on wireless communication quality information included in a message transmitted from the terminal device.

A sixth aspect of the present invention is the wireless communication system of the third aspect, wherein the terminal device is configured to, upon detecting the decrease in quality of communication with the main base station device while in communication with the main base station device, transmit a detection result to the management device, the detection result indicating the decrease in quality of communication, and wherein the management device detects the decrease in quality of communication based on the detection result transmitted from the terminal device.

A seventh aspect of the present invention is the wireless communication system of the first aspect, wherein the management device is a base station device configured to form a macro cell in a control plane, and wherein the management device is a base station device configured to form a small cell in a user plane.

In this configuration, since a base station device in a control plane which forms a macro cell handles all control data transfer operations between a terminal device and base station devices and the base station device in the control plane has a large communication coverage area, the terminal device and the base station devices can be managed in an efficient manner.

An eighth aspect of the present invention is the wireless communication system of the first aspect, wherein the management controller of the management device is configured to choose, as the main base station device, a base station device adapted for wireless communications utilizing High-SHF band or EHF band, and choose, as the backup base station device, a base station device adapted for wireless communications utilizing Low-SHF band.

In this configuration, a base station device utilizing High-SHF or EHF band provides a high throughput performance, and thus can be suitably used as a communication path for communicating user data. A base station device which forms a macro cell is not capable of accommodating traffic load carried by base station devices utilizing High-SHF or EHF band, and thus not suitably used as a backup base station device. However, a base station device utilizing Low-SHF provides a higher throughput performance and is less likely to be affected by obstacles, and thus is suitably used as a backup communication path.

A ninth aspect of the present invention is the wireless communication system of the first aspect, wherein the terminal controller of the terminal device is configured to, upon completion of establishing a connection with the backup base station device, stop monitoring an entire control channel region related to the backup base station device, and upon detecting the decrease in quality of communication with the main base station device, shift into a state in which the entire control channel region related to the backup base station device is monitored.

This configuration can reduce power consumption.

A tenth aspect of the present invention is the wireless communication system of the first aspect, wherein the terminal controller of the terminal device is configured to, upon completion of establishing a connection with the backup base station device, monitor a portion of a control channel region related to the backup base station device, and upon receiving, control data from the backup base station device, shift into a state in which an entire control channel region related to the backup base station device is monitored.

In this configuration, power consumption at the terminal is reduced. Furthermore, the configuration enables the terminal to communicate control data simultaneously with both a base station device serving as a normal communication path and a backup base station device serving as a backup communication path.

An eleventh aspect of the present invention is the wireless communication system of the first aspect, wherein the terminal controller of the terminal device is configured to, upon completion of establishing a connection with the backup base station device, control the connection with the backup base station device in such a manner as to repeatedly alternate a non-monitored state in which an entire control channel region is not monitored and a limited monitored state in which a portion of a control channel region related to the backup base station device is monitored at prescribed time periods, and upon receiving control data from the backup base station device, shift into a state in which the entire control channel region related to the backup base station device is monitored.

In this configuration, power consumption at the terminal is reduced. Furthermore, the configuration enables the terminal to communicate control data simultaneously with both a base station device serving as a normal communication path and a backup base station device serving as a backup communication path.

A twelfth aspect of the present invention is a management device for managing a terminal device and base station devices, each base station device being configuring for wireless communication with the terminal device and the management device, the management device comprising:

a management communication device configured to communicate with the terminal device and the base station devices; and a management controller configured to determine, among the base station devices, a main base station device which serves as a normal communication path, and a backup base station device which serves as a backup communication path, and to transmit a connection request message to the terminal device, the main base station device, and the backup base station device concurrently with transmitting a communication request message to the main base station device, wherein the main base station device transmits a path switching request message when a decrease in quality of communication occurs, and wherein the management controller, upon receiving the path switching request message from the main base station device, transfers the received path switching request message to the backup base station device.

In this configuration, power consumption at the terminal is reduced, and when quality of communication is decreased so that a change in communication paths becomes necessary, the terminal can quickly switch from a current communication path to another, and each base station device can be simplified in design configuration, in the same manner as the first aspect of the present invention.

A thirteenth aspect of the present invention is a management device for managing a terminal device and base station devices, each base station device being configuring for wireless communication with the terminal device and the management device, the management device comprising:

a management communication device configured to communicate with the terminal device and the base station devices; and a management controller configured to determine, among the base station devices, a main base station device which serves as a normal communication path, and a backup base station device which serves as a backup communication path, and to transmit a connection request message to the terminal device, the main base station device, and the backup base station device concurrently with transmitting a communication request message to the main base station device, wherein the management controller receives a path switching request message which is transmitted from the main base station device when a decrease in quality of communication occurs.

This configuration reduces power consumption at a terminal, enables a quick change from one communication path to another when detecting a decrease in quality of communication for communicating user data, and reduces time required to change communication paths, in the same manner as the second aspect of the present invention.

A fourteenth aspect of the present invention is a management device for managing a terminal device and base station devices, each base station device being configuring for wireless communication with the terminal device and the management device, the management device comprising:

a management communication device configured to communicate with the terminal device and the base station devices; and a management controller configured to determine, among the base station devices, a main base station device which serves as a normal communication path, and a backup base station device which serves as a backup communication path, and to transmit a connection request message to the terminal device, the main base station device, and the backup base station device concurrently with transmitting a communication request message to the main base station device, and wherein the management controller, upon detecting a decrease in quality of communication with the terminal device, transmits a path switching request message to the backup base station device.

In this configuration, power consumption at the terminal is reduced, and when quality of communication is decreased so that a change in communication paths becomes necessary, the terminal can quickly switch from a current communication path to another, and each base station device can be simplified in design configuration, in the same manner as the third aspect of the present invention.

A fifteenth aspect of the present invention is a communication path switching method for switching base station devices used for wireless communication with a terminal device, the method using a management device configured to manage the terminal device and the base station devices, the method comprising:

the management device determining, among the base station devices, a main base station device which serves as a normal communication path, and a backup base station device which serves as a backup communication path; and the management device transmitting a connection request message to the terminal device, the main base station device, and the backup base station device concurrently with transmitting a communication request message to the main base station device;

the main base station device and the backup base station device each completing establishment of a connection with the terminal device in response to the connection request message and/or the communication request message transmitted from the management device;

the main base station device, upon detecting a decrease in quality of communication with the terminal device, transmitting a path switching request message to the management device; and the management device, upon receiving the path switching request message transmitted from the main base station device, transferring the received path switching request message to the backup base station device.

In this configuration, power consumption at the terminal is reduced, and when quality of communication is decreased so that a change in communication paths becomes necessary, the terminal can quickly switch from a current communication path to another, and each base station device can be simplified in design configuration, in the same manner as the first aspect of the present invention.

A sixteenth aspect of the present invention is a communication path switching method for switching base station devices used for wireless communication with a terminal device, the method using a management device configured to manage the terminal device and the base station devices, the method comprising:

the management device determining, among the base station devices, a main base station device which serves as a normal communication path, and a backup base station device which serves as a backup communication path; and the management device transmitting a connection request message to the terminal device, the main base station device, and the backup base station device concurrently with transmitting a communication request message to the main base station device;

the main base station device and the backup base station device each completing establishment of a connection with the terminal device in response to the connection request message and/or the communication request message transmitted from the management device; and the main base station device, upon detecting a decrease in quality of communication with the terminal device, transmitting a path switching request message to the backup base station device.

This configuration reduces power consumption at a terminal, enables a quick change from one communication path to another when detecting a decrease in quality of communication for communicating user data, and reduces time required to change communication paths, in the same manner as the second aspect of the present invention.

A seventeenth aspect of the present invention is a communication path switching method for switching base station devices used for wireless communication with a terminal device, the method using a management device configured to manage the terminal device and the base station devices, the method comprising:

the management device determining, among the base station devices, a main base station device which serves as a normal communication path, and a backup base station device which serves as a backup communication path; and the management device transmitting a connection request message to the terminal device, the main base station device, and the backup base station device concurrently with transmitting a communication request message to the main base station device;

the main base station device and the backup base station device each completing establishment of a connection with the terminal device in response to the connection request message and/or the communication request message transmitted from the management device; and the management device, upon detecting a decrease in quality of communication between the main base station device and the terminal while the main base station device and the terminal device are in communication with each other, transmitting a path switching request message to the backup base station device.

In this configuration, power consumption at the terminal is reduced, and when quality of communication is decreased so that a change in communication paths becomes necessary, the terminal can quickly switch from a current communication path to another, and each base station device can be simplified in design configuration, in the same manner as the third aspect of the present invention.

Embodiments of the present invention will be described below with reference to the drawings.

First Embodiment

Figure 2:
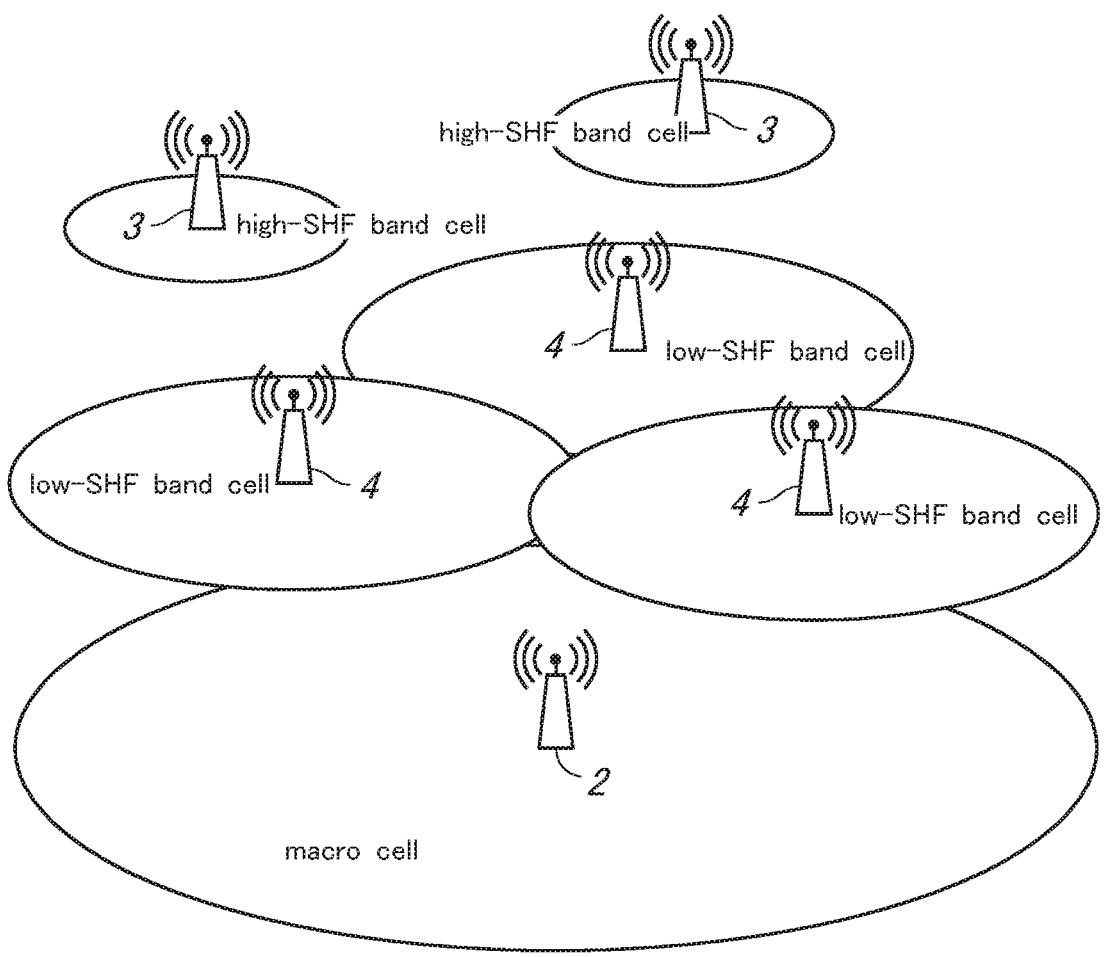
FIG. 2 is an explanatory view showing a situation in which cells are formed by base stations 2 to 4.

FIG. 1 is a diagram showing a general configuration of a wireless communication system according to a first embodiment of the present invention. FIG. 2 is an explanatory view showing a situation in which cells are formed by base stations 2 to 4.

The wireless communication system includes a terminal 1 (terminal device), and further comprises a first base station 2 (base station device), a second base station 3 (base station device), and a third base station 4 (base station device), which base stations are configured for wireless communication with the terminal 1.

The first, second, and third base stations 2, 3, 4 are mutually connected via an X2 interface or an Xn interface. Also, the first, second, and third base stations 2, 3, 4 are connected to the Internet via an S1 interface or an NG-U interface as well as an upper core network. A serving gateway device 5 (S-GW) and a mobility management device 6 (MME) are arranged in the core network. In the present embodiment, each node of the core network is denoted by a name (S-GW, MME) commonly used in 4G systems. However, this name of node may be changed when used in 5G systems.

The first base station 2 performs wireless communication in UHF band, and forms a macro cell (see FIG. 2). The first base station 2 is a base station in a control plane (C-Plane) for transmitting control signals. The first base station 2 can also be used as a base station in a user plane (U-Plane) for transmitting user data.

The second base station 3 performs wireless communication in High SHF band or EHF band, and forms a small cell (see FIG. 2). The third base station 4 performs wireless communication in low SHF band, and forms a small cell (see FIG. 2). The second and third base stations 3 and 4 are base stations in the user plane (U-Plane) for transmitting user data.

The macro cell, the small cell in the low SHF band, and the small cell in the high SHF band are arranged such that their communication areas overlap each other, and thus the terminal 1 can use the first to third base stations 2 to 4 simultaneously.

Figure 3:
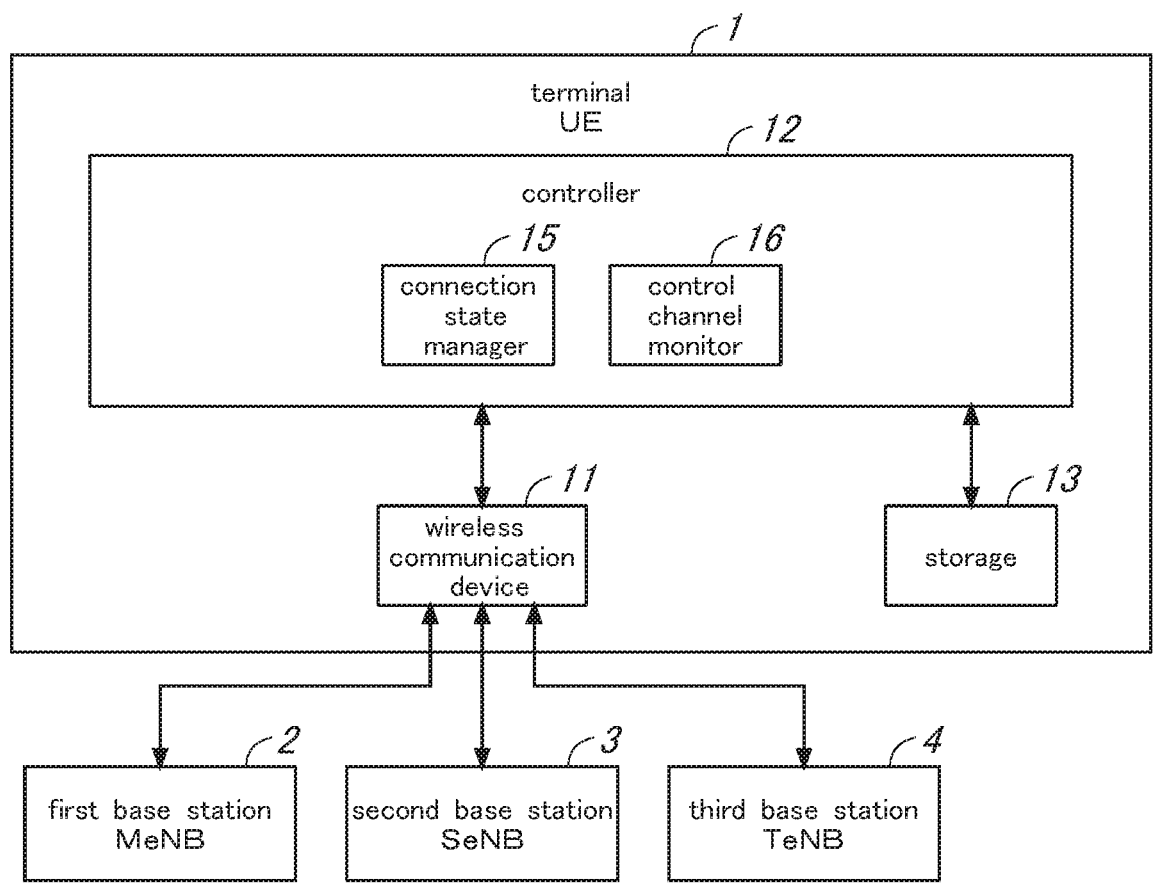
FIG. 3 is a block diagram showing a schematic configuration of a terminal 1.

Next, a schematic configuration of the terminal 1 will be described. FIG. 3 is a block diagram showing a schematic configuration of the terminal 1.

The terminal 1 includes a wireless communication device 11, a controller 12, and a storage 13.

The wireless communication device 11 performs wireless communication with the base stations 2 to 4.

The storage 13 stores control data and user data, which are to be transmitted to and from the wireless communication device 11. The storage 13 also stores programs executable by the controller 12.

The controller 12 includes a connection state manager 15 and a control channel monitor 16. The controller 12 is implemented primarily on a processor, and each unit of the controller 12 is implemented by causing the processor to execute a program stored in the storage 13.

The connection state manager 15 manages its currently connected the base stations 3 and 4. That is, the second base station 3 (main base station device) serves as a normal communication path, which is used under normal connection conditions, and the third base station 4 (backup base station device) serves as a backup communication path, which is used when the connection state manager detects a decrease in quality of communication between the second base station 3 and the terminal 1 due to blockage of propagation by obstacles.

The control channel monitor 16 monitors control channels assigned to each of the currently connected base stations 3 and 4, e.g. PDCCDs (Physical Downlink Control Channels), and detects a control channel(s) for the terminal itself among the received control channels.

Figure 4:
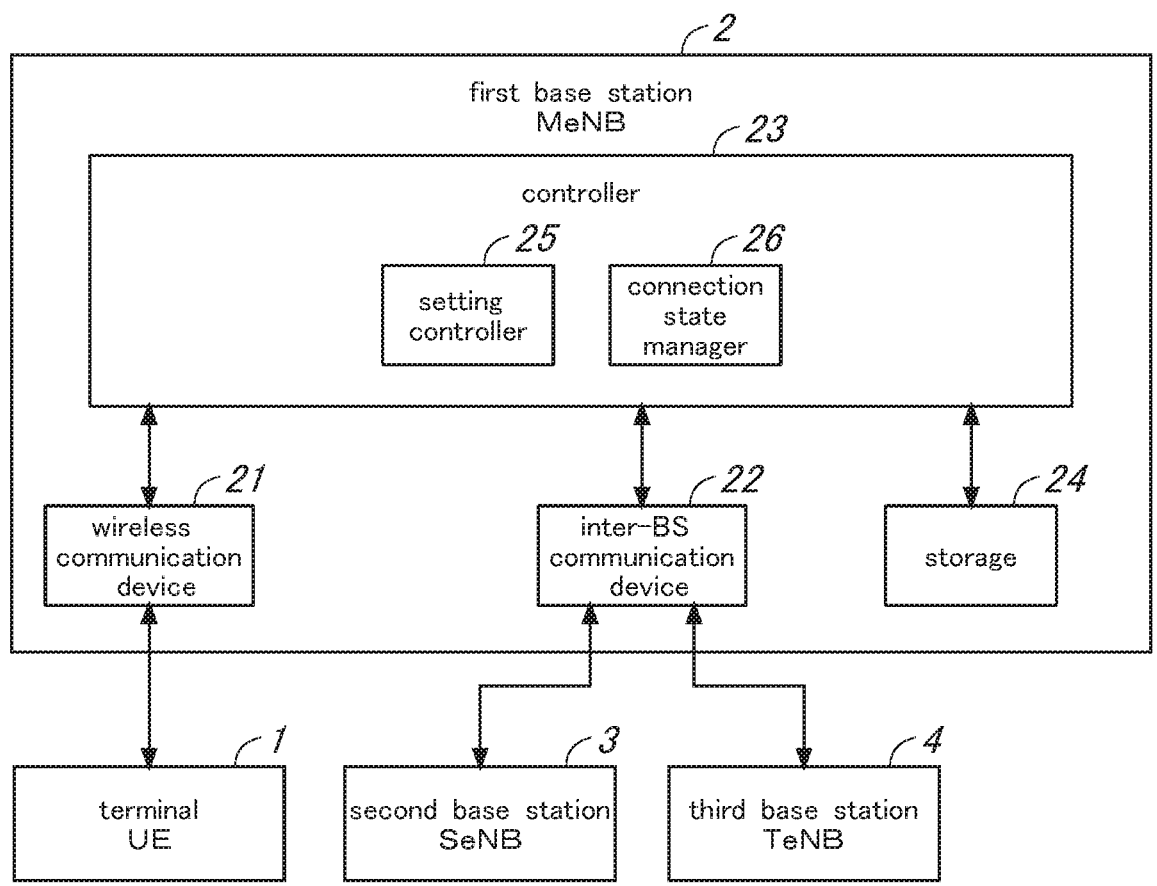
FIG. 4 is a block diagram showing a schematic configuration of a first base station 2.

Next, a schematic configuration of the first base station 2 will be described. FIG. 4 is a block diagram showing a schematic configuration of the first base station 2.

The first base station 2 includes a wireless communication device 21, an inter-base-station communication device 22, a controller 23, and a storage 24.

The wireless communication device 21 performs wireless communication with the terminal 1.

The inter-base-station communication device 22 is configured to communicate with the second and third base stations 3 and 4 via the X2 interface.

The storage 24 stores control data and user data, which are transmitted to and from the wireless communication device 21 and the inter-base-station communication device 22. The storage 24 also stores programs executable by the controller 23.

The controller 23 includes a setting controller 25 and a connection state manager 26. The controller 23 is implemented primarily on a processor, and each unit of the controller 23 is implemented by causing the processor to execute a program stored in the storage 24.

The setting controller 25 performs processing operations such as setting operations, change operations, and management operations with regard to RRC (radio resource control). For example, the setting controller 25 determines the base stations 3 and 4 in the user plane connected to the terminal 1; that is, the base station 3 serving as a normal communication path for user data and the base station 4 serving as a backup communication path. Moreover, the setting controller 25 generates messages, which are transmitted to and from the other base stations 2 to 4 and messages, which are transmitted to and from the terminal 1.

In the present embodiment, when determining the base stations 3 and 4 to be connected to the terminal 1 as communication paths for communicating user data, the setting controller preferentially chooses the second base station 3 utilizing high SHF band which provides a high throughput performance as a normal communication path and the third base station 4 utilizing the low SHF band as a backup communication path.

The connection state manager 26 manages, for each terminal 1, the base stations 3 and 4 (i.e. the second base station 3 serving as the normal communication path and the third base station 4 serving as the backup communication path) currently connected to the terminal 1.

Next, a connection state management table used in the connection state manager 26 will be described. FIG. 5 is an explanatory view showing an example of a connection state management table.

The connection state manager 26 uses the connection state management table (including connection state management information) to manage, for each terminal 1, the base stations 3 and 4 (i.e. the second base station 3 serving as a normal communication path and the third base station 4 serving as a backup communication path) currently connected to the terminal 1. The connection state management table is stored in a storage 44.

The connection state management table includes columns representing the first base station 2 (MeNB), the second base station 3 (SeNB), and the third base station 4 (TeNB) in which, for each terminal 1, a corresponding row indicates identification codes (cell ID) of the base stations 2 to 4 currently connected to the terminal. The connection state management table further includes columns the C-Plane, the main U-Plane, and the Backup U-Plane in which, for each terminal 1, a corresponding row indicates: the base station 2 (MeNB), which performs C-Plane communication; the base stations 3 and 4 (SeNB and TeNB), which perform normal U-Plane communication (i.e. serves as a normal communication path for use data); and the base stations 3 and 4 (SeNB and TeNB) which perform backup U-Plane communication (i.e. serve as backup communication paths), respectively. Under some circumstances, some cells include no registered code in the column for the third base station 4 (TeNB) and no registered code of the base stations 3 or 4 in the column for the Backup U-Plane.

When forming initial connections, the first base station determines the base stations 3, 4 to be connected to the terminal. Once the terminal 1 is connected to the base stations 3 and 4, information on the terminal 1 and the base stations 3 and 4 connected thereto is newly registered in the connection state management table. Further, when connection paths are switched, the cells in the U-Plane column of the connection state management table are updated so as to reflect the change in the connection state; that is, the connection path switch between the base stations 3, 4.

Figure 6:
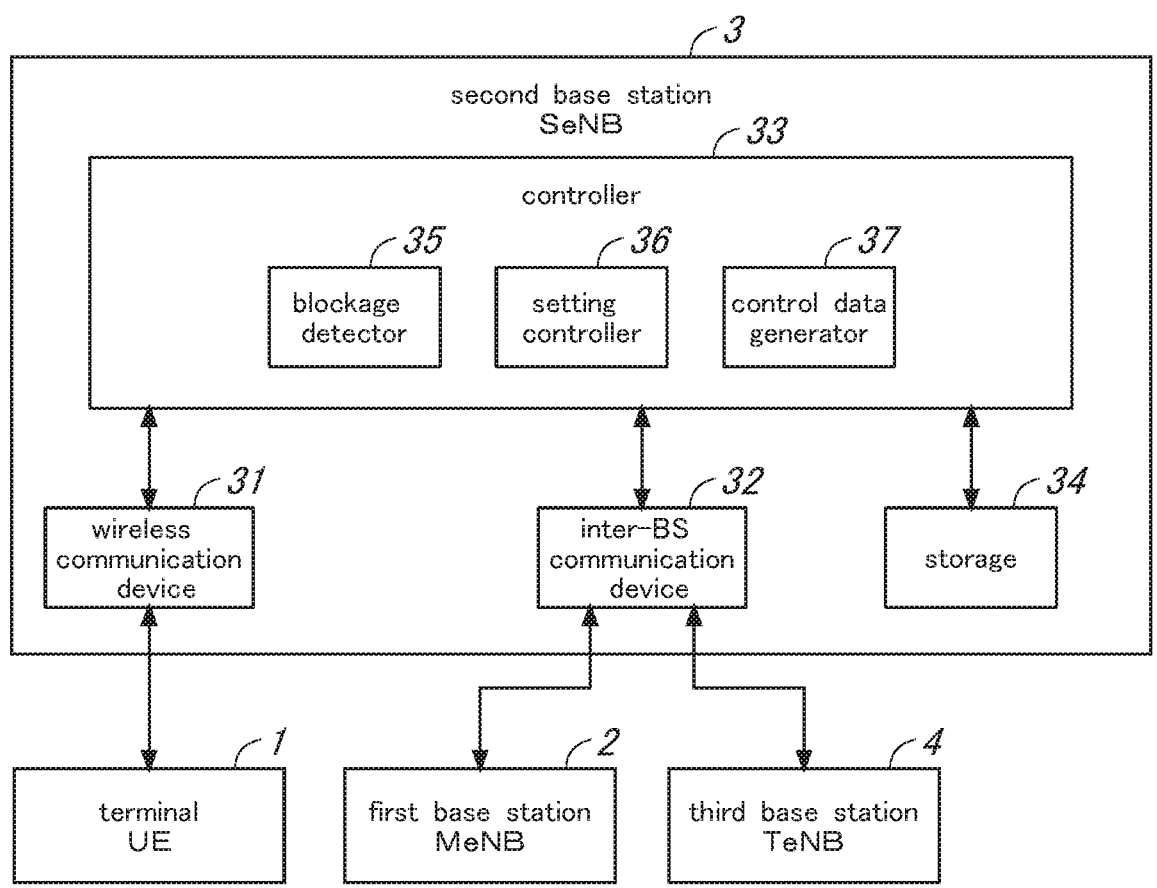
FIG. 6 is a block diagram showing a schematic configuration of a second base station 3.

Next, a schematic configuration of the second base station 3 will be described. FIG. 6 is a block diagram showing a schematic configuration of the second base station 3.

The second base station 3 includes a wireless communication device 31, an inter-base-station communication device 32, a controller 33, and a storage 34.

The wireless communication device 31 performs wireless communication with the terminal 1.

The inter-base-station communication device 32 is configured to communicate with the first and the third base stations 2, 4 via the X2 interface.

The storage 34 stores control data and user data, which are transmitted to and from the wireless communication device 31 and the inter-base-station communication device 32. The storage 34 also stores programs executable by the controller 33.

The controller 33 includes a blockage detector 35, a setting controller 36 and a control data generator 37. The controller 33 is implemented primarily on a processor, and each unit of the controller 23 is implemented by causing the processor to execute a program stored in the storage 24.

The blockage detector 35 detects a blockage of communication with the terminal 1 based on a reception status (e.g., reception intervals) of an uplink signal from the terminal 1. Examples of the uplink signals include L2 control signals, specifically, uplink ACK/NACK signals, and CQI (Channel Quality Indicator) signals. A basis of blockage detection may be L1 radio quality information (e.g. received power, SN) other than the L2 control signals. In some cases, a blockage may be detected based on the number of times of continuous reception of NACK, a time period of no-NACK-reception, or an abrupt change in CQI.

In the present embodiment, the second base station 3 detects a blockage of communication with the terminal 1 based on the reception status of the uplink signal from the terminal 1. However, in some cases, the system may be configured such that the terminal 1 detects a blockage of communication with the second and third base stations 3, 4, and upon detecting a blockage, the terminal 1 transmits a measurement result reporting massage (Measurement Report) to the first base station 2, which, in turn, notifies the second base station 3 of the detection of blockage.

The setting controller 36 generates messages which are transmitted to and from the base stations 2 and 4, and messages which are transmitted to and from the terminal 1.

The control data generator 37, according to the connection state of each terminal 1, performs mapping operation to assign to a control channel (e.g. PDCCH) for transmission of control data to and from the terminal 1, and then generates control data related to the transmission of control data between the second base station itself and the terminal 1. The control data is attached to a prescribed message signal and transmitted to the terminal 1.

Figure 7:
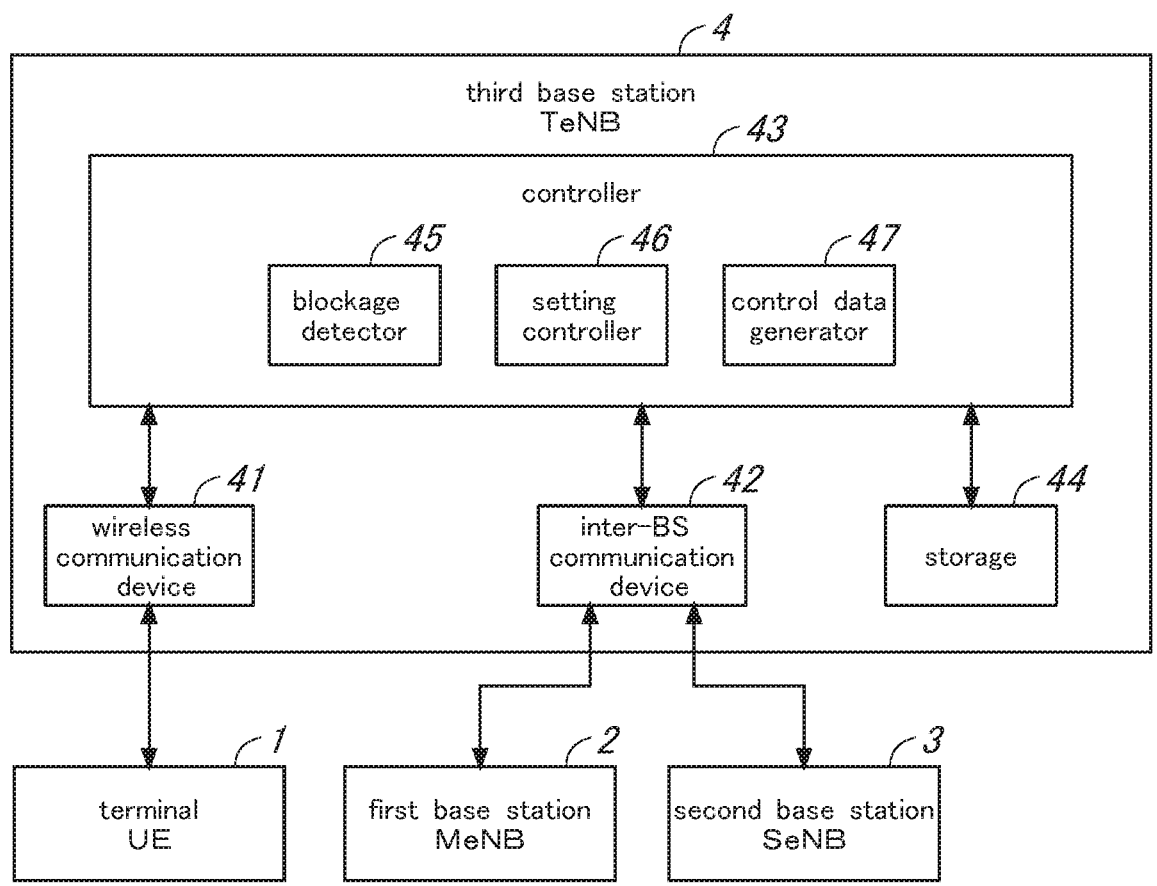
FIG. 7 is a block diagram showing a schematic configuration of a third base station 4.

Next, a schematic configuration of the third base station 4 will be described. FIG. 7 is a block diagram showing a schematic configuration of the third base station 4.

Like the second base station 3, the third base station 4 includes a wireless communication device 41, an inter-base-station communication device 42, a controller 43, and a storage 44. Moreover, like the second base station 3, the controller 43 includes a blockage detector 45, a setting controller 46 and a control data generator 47.

Figure 8:
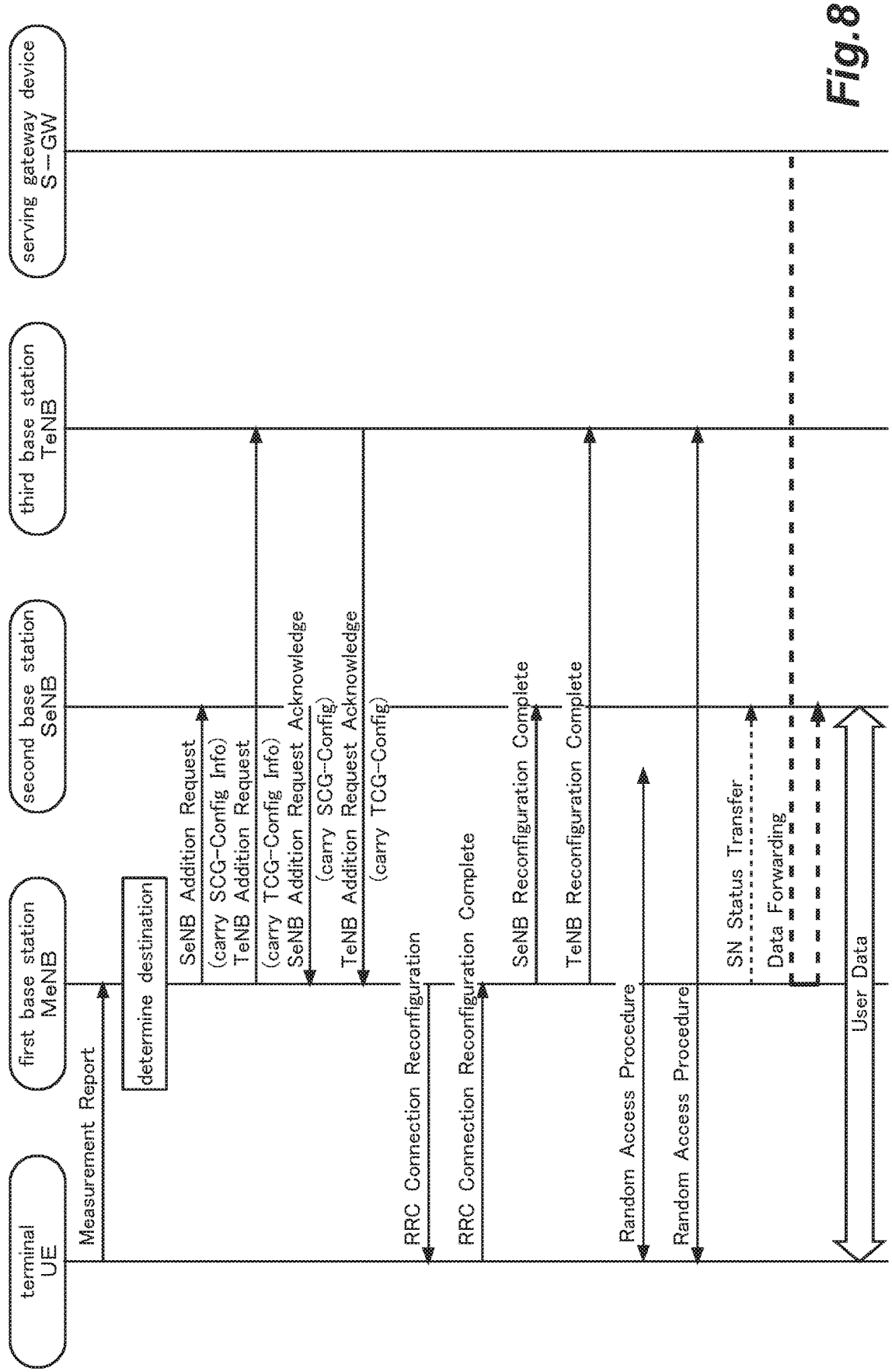
FIG. 8 is a sequence diagram showing an operation procedure when forming initial connections.

Next, operations of the system of the present invention when forming initial connections will be described. FIG. 8 is a sequence diagram showing an operation procedure when forming initial connections.

First, the terminal 1 transmits a measurement result reporting message (Measurement Report) to the first base station 2. In the first base station 2, the setting controller 25 determines the second base station 3 as a normal communication path and the third base station 4 as a backup communication path based on information on connection destination candidates included in the measurement result reporting message transmitted from the terminal 1.

Next, the first base station 2 transmits, to the second base station 3, an addition request message (SeNB Addition Request) for requesting a base station to be added as the second base station 3. Then, the first base station transmits, to the third base station 4, an addition request message (TeNB Addition Request) for requesting a base station to be added as the third base station 4. Then, the second base station 3 transmits, to the first base station 2, a message of addition request acknowledgment (SeNB Addition Request Acknowledge) for notifying the acceptance of the request. Furthermore, the third base station 4 transmits, to the first base station 2, a message of addition request acknowledgment (TeNB Addition Request Acknowledge) for notifying the acceptance of the request.

In some cases, the system may be configured such that the first base station 2 transmits, to the second base station 3, an addition request message (SeNB Addition Request) for requesting a base station to be added as the second base station 3, and in response, the second base station 3 transmits, to the first base station 2, a message of addition request acknowledgment (SeNB Addition Request Acknowledge) for notifying the acceptance of the request, and after establishment of a connection with the second base station 3, the first base station transmits, to the third base station 4, an addition request message (TeNB Addition Request) for requesting a base station be added as the third base station 4 in order to establish a connection with the third base station 4.

Next, the first base station 2 transmits, to the terminal 1, a connection reconfiguration request message (RRC Connection Reconfiguration). Then, the terminal 1 transmits, to the first base station 2, a connection reconfiguration complete message (RRC Connection Reconfiguration Complete).

Next, the first base station 2 transmits, to the second base station 3, a connection reconfiguration complete message (SeNB Reconfiguration Complete). Then, the first base station 2 transmits, to the third base station 4, a connection reconfiguration complete message (TeNB Reconfiguration Complete).

Next, a random access procedure (Random Access Procedure) is performed between the terminal 1 and the second base station 3. Then, a random access procedure (Random Access Procedure) is performed between the terminal 1 and the third base station 4.

Even when uplink synchronization is achieved by according to the random access procedure (Random Access Procedure) as shown in FIG. 8, the synchronization can be lost when actually performing communication. In this view, the terminal 1 may perform the random access procedure (Random Access Procedure) with the third base station 4 to achieve the synchronization therewith right before starting communication.

Next, the first base station 2 transmits, to the second base station 3, a data transfer status notification (SN Status Transfer) message (communication request message for requesting start to communication). The data transfer status notification message indicates the transfer status of user data in the first place. However, the data transfer status notification can also notify the second base station 3 of a request for communication with the terminal 1.

Next, processing operation for transferring untransmitted user data (Data Forwarding) is performed between the serving gateway device and the first base station 2 and the second base station 3. Then, the terminal 1 and the second base station 3 start to communicate user data therebetween.

In some cases, the system may be configured such that the first base station 2 transmits, to the terminal 1, connection reconfiguration request messages (RRC Connection Reconfiguration) for the second base station 3 and the third base station 4, separately.

Figure 9:
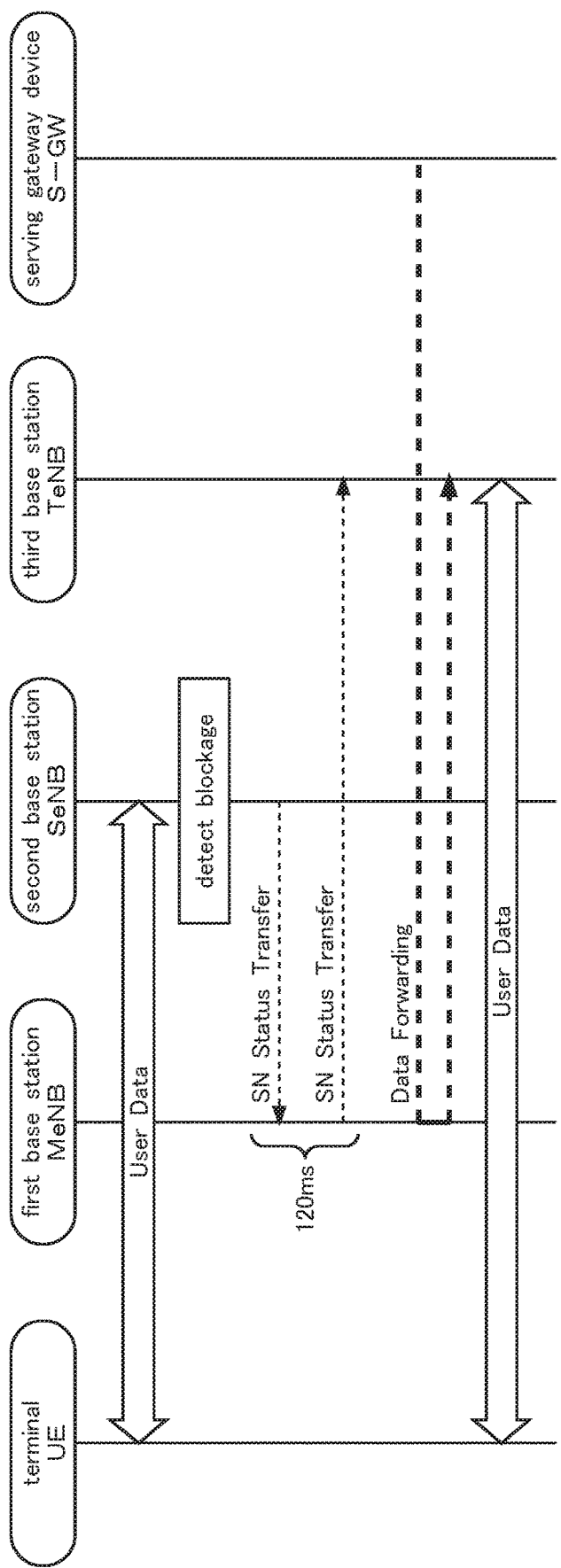
FIG. 9 is a sequence diagram showing an operation procedure for switching communication paths.

Next, operations of the system of the present invention when changing communication paths will be described. FIG. 9 is a sequence diagram showing an operation procedure for switching communication paths (switching from one communication path to another).

In the present embodiment, when forming initial connections (see FIG. 8), the terminal 1 is connected both to the second base station 3 serving as the normal communication path and to the third base station 4 serving as the backup communication path, and then the terminal 1 and the second base station 3 start to communicate user data.

When the blockage detector 35 in the second base station 3 detects a blockage of communication with the terminal 1, the second base station 3 transmits, to the first base station 2, a data transfer status notification (SN Status Transfer) message (path switching request message for requesting change communication paths). Then, the first base station 2 transmits, to the third base station 4, the data transfer status notification (SN Status Transfer) message (path switching request message) in the same manner. These processing operations require, for example, 120 ms. In the present embodiment, it is assumed that 4G X2 interfaces are used. Since an X2 interface has a maximum delay of generally 60 ms, a two-way communication requires 120 ms. However, use of a 5G interface reduces the time required for necessary communication.

Although the data transfer status notification (SN Status Transfer) message indicates the transfer status of user data in the first place, the data transfer status notification can also notify the second base station 3 and the third base station 4 of a request for changing or switching change communication paths.

Next, processing operations for transferring untransmitted user data (Data Forwarding) is performed between the serving gateway device and the first base station 2 and the third base station 4. Then, the terminal 1 and the third base station 4 start to communicate user data therebetween.

It should be note that a data transfer status notification (SN Status Transfer) message contains sequence numbers of user data which have already transferred from a transmitter to a receiver. Thus, the sequence numbers can be used to determine untransmitted user data, which have not been transferred through the processing operations for transferring data (Data Forwarding).

In this way, in the present embodiment, the terminal is connected in advance to both the second base station 3 serving as a normal communication path and the third base station 4 serving as a backup communication path. Thus, upon detecting a blockage of propagation, communications paths can be quickly switched and restart to communicate user data.

In the embodiment shown in FIG. 9, the second base station 3 transmits, to the first base station 2, a data transfer status notification (SN Status Transfer) message. However, the system may be configured such that the second base station 3 transmits, to the first base station 2, a path switching request (Change Request) message for requesting for switching communication paths in place of an SN Status Transfer.

Figure 10:
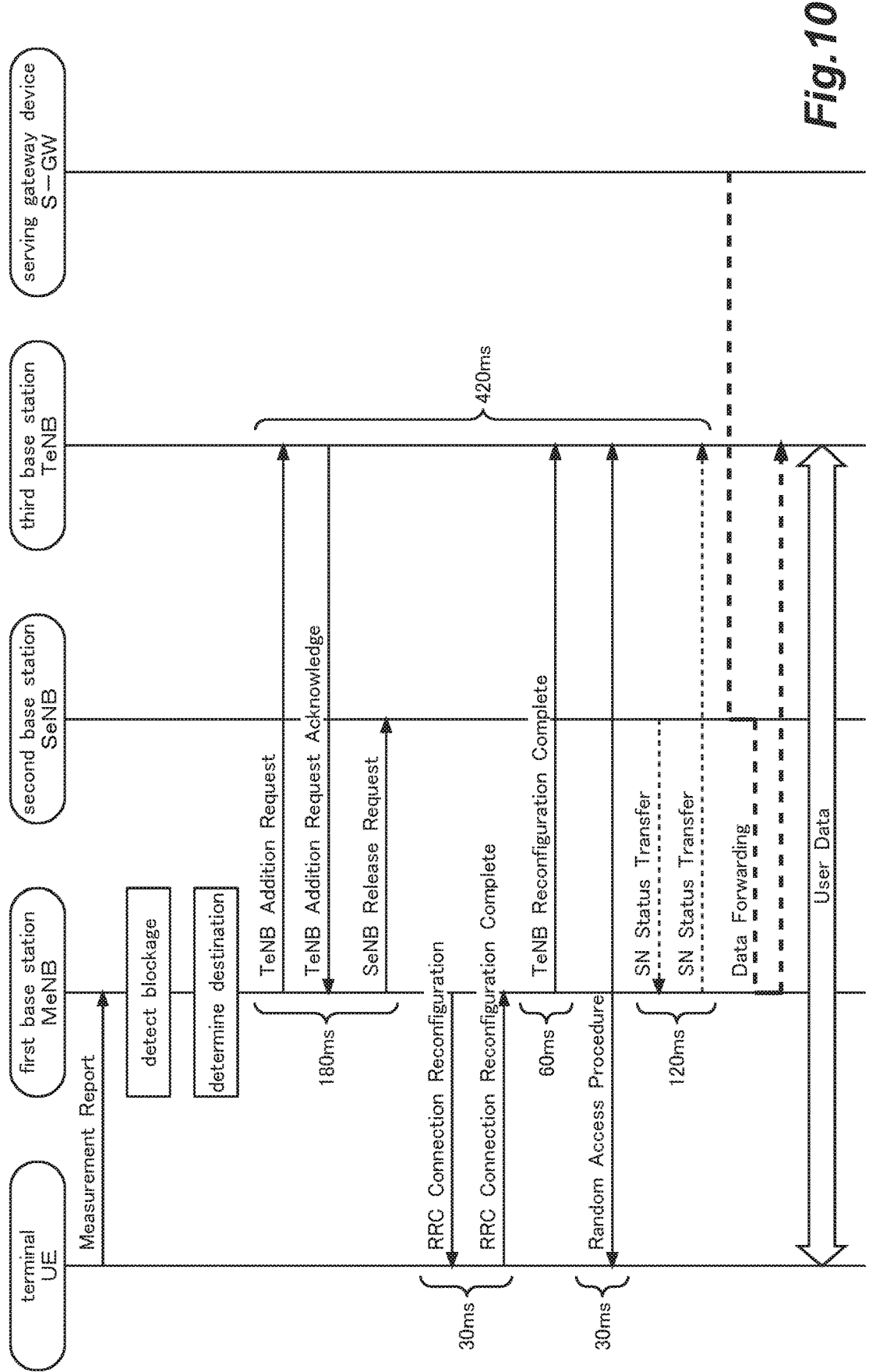
FIG. 10 is a sequence diagram showing an operation procedure for switching communication paths according to a comparative embodiment.

Next, a comparative embodiment, in which communication paths are switched without advanced establishment of a connection for a backup communication path as in the present invention, will be described. FIG. 10 is a sequence diagram showing an operation procedure for switching communication paths according to such a comparative embodiment.

First, the terminal 1 transmits a measurement result reporting message (Measurement Report) to the first base station 2. When detecting a blockage of communication between the terminal 1 and the second base station 3 based on information on quality of wireless communication contained in the measurement result reporting message (Measurement Report), the first base station 2 determines the third base station 4 as a new connection destination based on information on connection destination candidates included in the measurement result reporting message (Measurement Report).

Next, the first base station 2 transmits, to the third base station 4, an addition request message (TeNB Addition Request) for requesting a base station to be added as the third base station 4. Then, the third base station 4 transmits, to the first base station 2, a message of addition request acknowledgment (TeNB Addition Request Acknowledge) for notifying the acceptance of the request. Furthermore, the first base station 2 transmits, to the second base station 3, a release request message (SeNB Release Request). These processing operations require, for example, 180 ms.

Next, the first base station 2 transmits, to the terminal 1, a connection reconfiguration request message (RRC Connection Reconfiguration). Then, the terminal 1 transmits, to the first base station 2, a connection reconfiguration complete message (RRC Connection Reconfiguration Complete). These processing operations forming a two-way communication require, for example, 30 ms.

Then, the first base station 2 transmits, to the third base station 4, a connection reconfiguration complete message (TeNB Reconfiguration Complete). This processing operation requires, for example, 60 ms.

Next, a random access procedure (Random Access Procedure) is performed between the terminal 1 and the third base station 4. This processing operation requires, for example, 30 ms.

Next, the second base station 3 transmits, to the first base station 2, a data transfer status notification (SN Status Transfer) message. Then, the first base station 2 transmits, to the third base station 4, a data transfer status notification (SN Status Transfer) message. These processing operations require, for example, 120 ms.

Next, processing operation for transferring untransmitted user data (Data Forwarding) to the third base station 4 is performed. Then, the terminal 1 and the third base station 4 start to communicate user data therebetween.

In this way, when communication paths are switched without advanced establishment of a connection for a backup communication path, the terminal 1 is not connected to the third base station 4 until a blockage of communication is detected. As a result, the processing operation to switch communications paths and restart communication requires a rather longer time (e.g. 420 ms) than the present invention.

Figure 11:
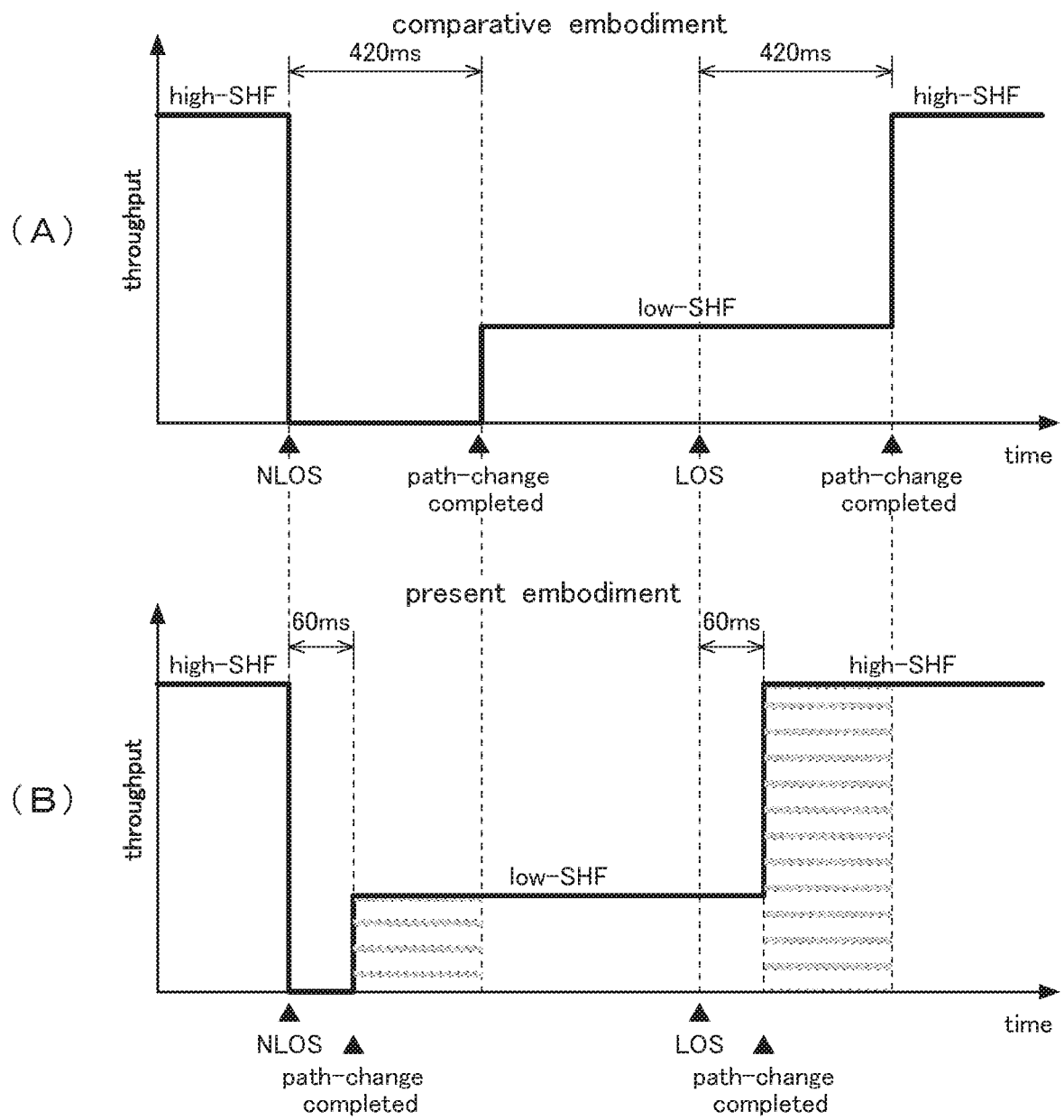
FIG. 11 is an explanatory view showing how communication paths are switched.

Next, how communication paths are switched will be described. FIG. 11 is an explanatory view showing how communication paths are switched.

In the present embodiment, first, communication is performed between the second base station 3 serving as a normal communication path and the terminal 1 through the communication path in high SHF band, which provides a high throughput performance. When a communication link between the second base station 3 and the terminal 1 is blocked and is into NLOS (Non Line Of Sight) state, the communication path is switched from the second base station 3 to the third base station 4 serving as a backup communication path. After the change in communication paths is completed, communication is performed between the terminal 1 and the third base station 4 through the communication path in low SHF band, which provides a low throughput performance.

Then, when the communication link between the second base station 3 and the terminal 1 is no longer blocked and is into LOS (Line Of Sight) state, the communication path is switched from the third base station 4 back to the second base station 3. After the change in communication paths is completed, communication is performed between the terminal 1 and the second base station 3 through the communication path in high SHF band, which again provides a high throughput performance.

As shown in FIG. 11B, the system of the present embodiment requires reduce time to complete the change in communication paths compared to that of the comparative embodiment as shown in FIG. 11A. Specifically, while the system of the comparative embodiment shown in FIG. 11A requires, for example, 420 ms to complete the change in communication paths, the system of the present embodiment shown in FIG. 11B requires, for example, 60 ms to complete the change in communication paths. Therefore, when a communication path is blocked, the system of the present embodiment can complete the change in communication paths 360 ms quicker than the comparative embodiment, and restart to communicate user data in low SHF band, which provides a low throughput performance. Similarly, when a blockage of communication path is eliminated, the system of the present embodiment can start again to communicate user data through a communication path in high SHF band, which provides a high throughput performance, 360 ms quicker than the comparative embodiment.

Second Embodiment

Figure 12:
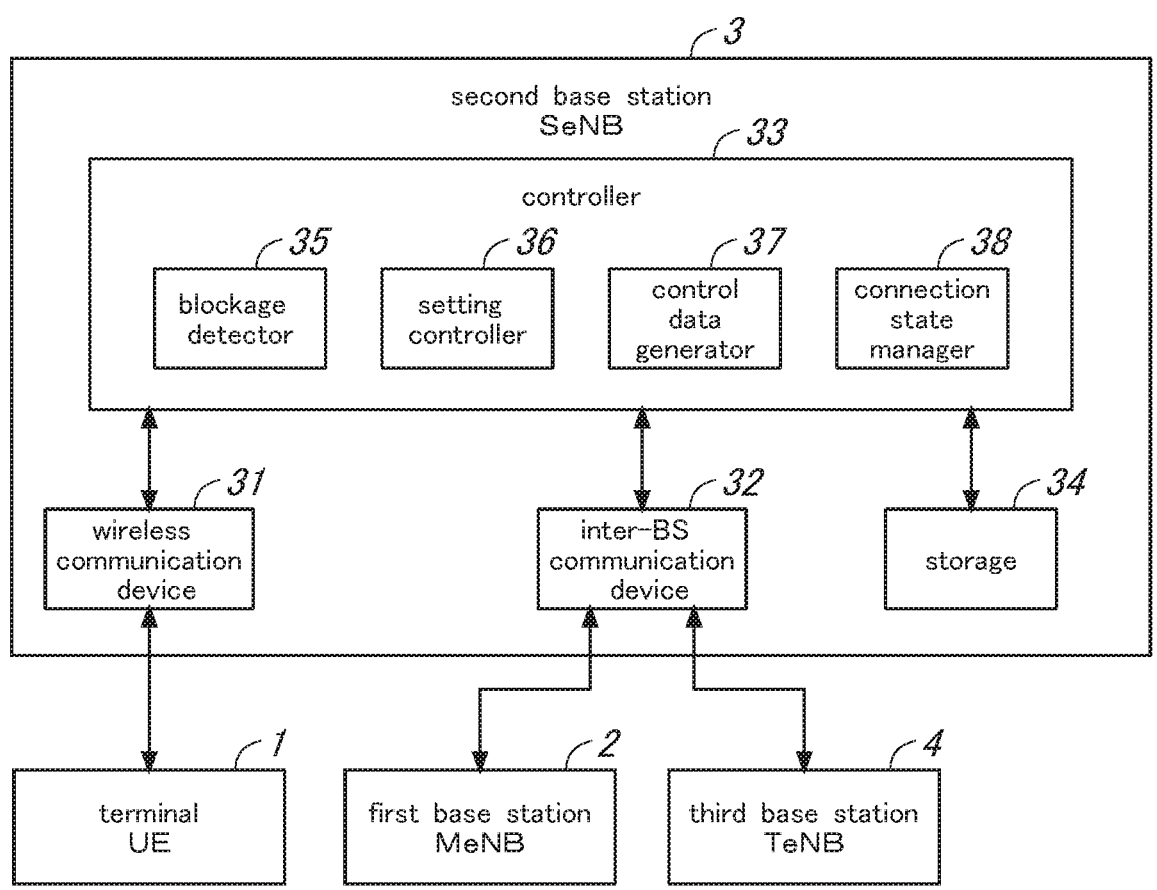
FIG. 12 is a block diagram showing a schematic configuration of a second base station 3 according to a second embodiment of the present invention.
Figure 13:
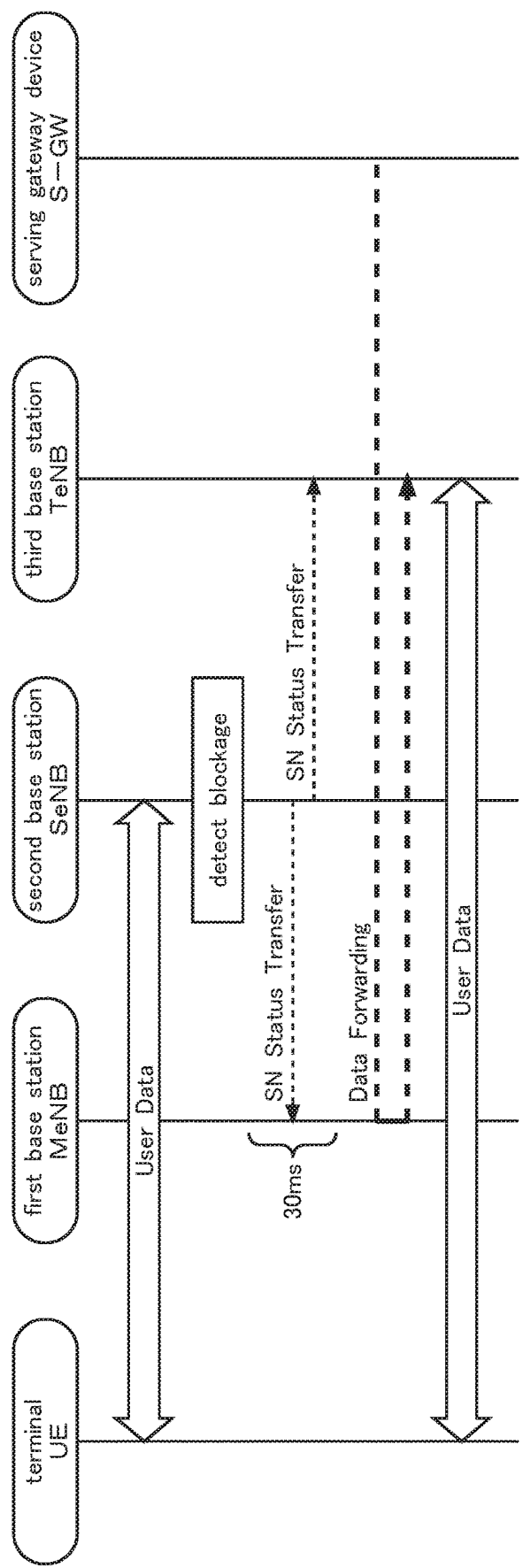
FIG. 13 is a sequence diagram showing an operation procedure for switching communication paths according to the second embodiment of the present invention.

Next, a second embodiment of the present invention will be described. Except for what will be discussed here, the configuration of the present embodiment is the same as that of the first embodiment. FIG. 12 is a block diagram showing a schematic configuration of a second base station 3 according to the second embodiment of the present invention. FIG. 13 is a sequence diagram showing an operation procedure for switching communication paths according to the second embodiment of the present invention.

In the first embodiment of the present invention (see FIG. 4), the first base station 2 includes the connection state manager 26, which manages, for each terminal 1, the base stations 3 and 4 (i.e. the second base station 3 serving as the normal communication path and the third base station 4 serving as the backup communication path) currently connected to the terminal 1, whereas, in the second embodiment, the second base station additionally includes a connection state manager 38 as shown in FIG. 12.

The connection state manager 38 also uses the connection state management table as in the first base station 2 (see FIG. 5) to manage, for each terminal 1, the base stations 2 to 4 currently connected to the terminal 1. The connection state management table is attached to a prescribed message signal and transmitted from the first base station 2 to the second base station 3 in advance (e.g. when initial connections are completed). The transmitted connection state management table is stored in the storage 34 at the second base station 3.

In the first embodiment of the present invention (see FIG. 9), when the second base station 3 detects a blockage of communication with the terminal 1, the second base station 3 transmits a data transfer status notification (SN Status Transfer) message (path switching request message for requesting change communication paths) to the third base station 4 via the first base station 2, whereas, in the second embodiment, the second base station 3 transmits a data transfer status notification (SN Status Transfer) message (path switching request message) directly to the third base station 4 as shown in FIG. 13. In addition, the second base station 3 transmits, to the first base station 2, a data transfer status notification (SN Status Transfer) message (path switching report message for reporting path switching). These processing operations require, for example, 30 ms, which means that it takes less time to perform switching communications paths than in the first embodiment.

In the first embodiment, since the first base station 2 recognizes the second and third base stations 3 and 4 currently connected to the terminal 1, the first base station 2 can transmit a data transfer status notification message to the third base station 4 in response to a data transfer status notification message from the second base station 3. In the second embodiment, since the second base station 3 transmits a data transfer status notification message directly to the third base station 4, it is necessary for the second base station 3 to be notified of the third base station 4 currently connected to the terminal 1. For this reason, in the second embodiment as shown in FIG. 12, the second base station 3 also includes the connection state manager 38.

Third Embodiment

Figure 14:
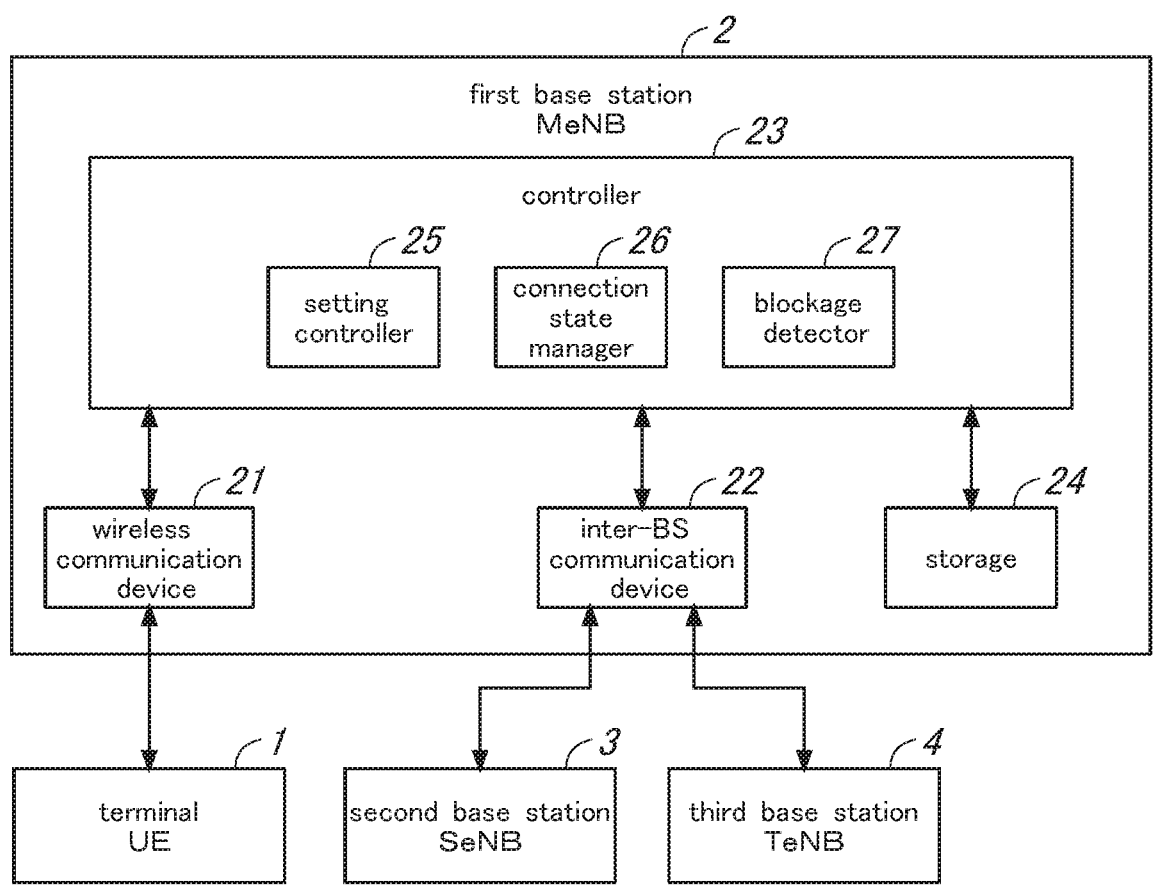
FIG. 14 is a block diagram showing a schematic configuration of a first base station 2 according to a third embodiment of the present invention.
Figure 15:
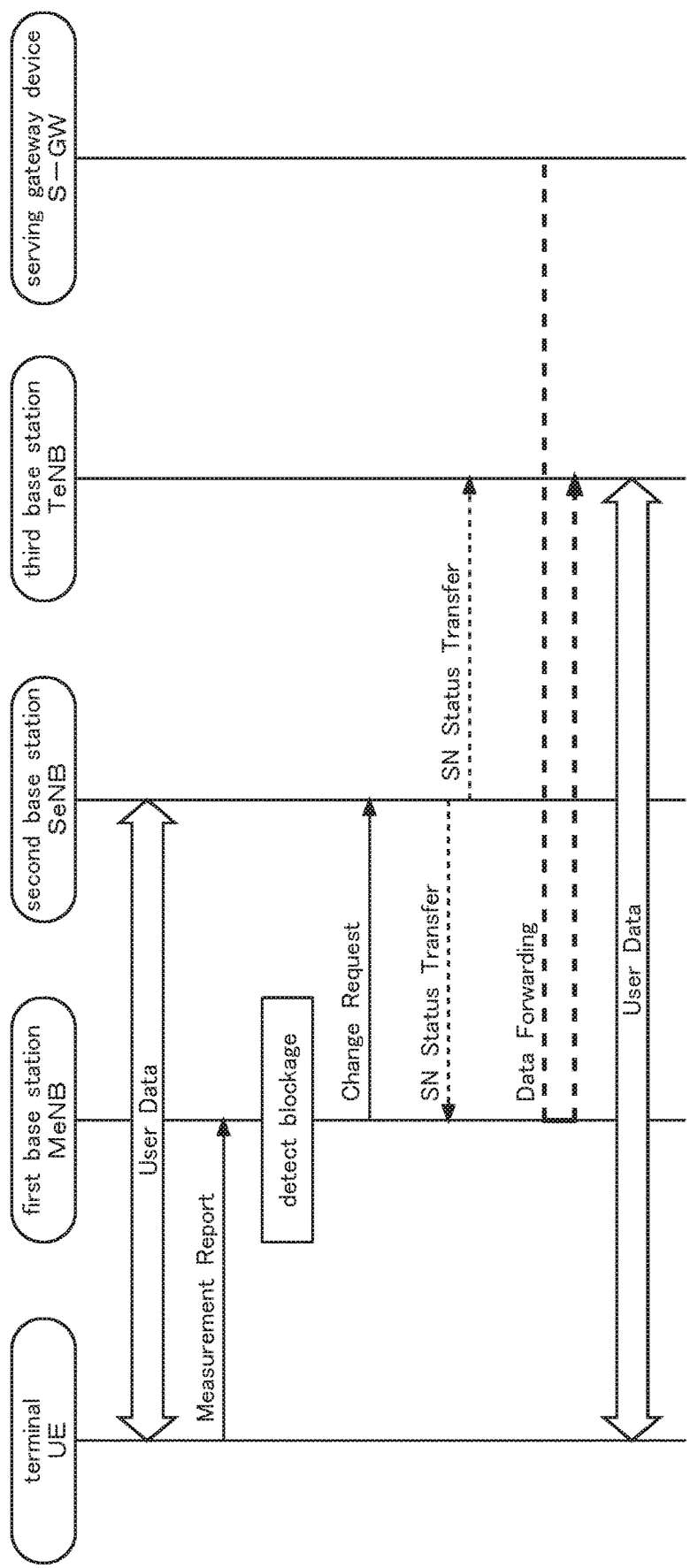
FIG. 15 is a sequence diagram showing an operation procedure for switching communication paths according to the third embodiment of the present invention.

Next, a third embodiment of the present invention will be described. Except for what will be discussed here, the configuration of the present embodiment is the same as that of the above-described embodiments. FIG. 14 is a block diagram showing a schematic configuration of a first base station 2 according to the third embodiment of the present invention. FIG. 15 is a sequence diagram showing an operation procedure for switching communication paths according to the third embodiment of the present invention.

In the first embodiment (see FIG. 6), the second base station 3 (main base station) serving as the normal communication path includes the blockage detector 35, which detects a blockage of communication with the terminal 1 based on the reception status of an uplink signal from the terminal 1, whereas, in the third embodiment, the first base station 2 includes a blockage detector 27 as shown in FIG. 14.

The blockage detector 27 detects a blockage of communication between the second base station 3 and the terminal 1 based on a measurement result reporting massage (Measurement Report) transmitted from the terminal 1. The measurement result reporting massage (Measurement Report) contains information on communication quality of a downlink signal (communication quality information on a downlink signal) transmitted from the second base station 3, and the blockage detector can detect a blockage of communication based on a change (an abrupt decrease) in a value in the communication quality information.

As shown in FIG. 15, when the blockage detector 27 detects a blockage of communication, the first base station 2 (management device) transmits, to the second base station 3 (main base station), a change request (Change Request) massage (path switching request message for requesting change communication paths). In response to the path switching request message (Change Request), the second base station 3 transmits a data transfer status notification (SN Status Transfer) message (path switching request message for requesting change communication paths) to the third base station 4 (backup base station). The second base station 3 also transmits, to the first base station 2, a data transfer status notification (SN Status Transfer) message (path switching report message for reporting path switching).

In some cases, the system may be configured such that the first base station 2 transmits a path switching request message directly to the third base station 4. Alternatively, the system may be configured such that the first base station 2 transmits, to the second base station 3, a release request message (SeNB Release Request) in place of a path switching request message (Change Request). In this case, upon receiving the release request message from the first base station 2, the second base station 3 transmits a data transfer status notification (SN Status Transfer) message to the first base station 2, which in turn transmits the data transfer status notification (SN Status Transfer) message to the third base station 4.

In the above-described embodiments, the system is configured such that the second base station 3 detects a blockage of communication with the terminal 1 based on the communication quality information contained in the measurement result reporting massage (Measurement Report). However, in some cases, the system may be configured such that the terminal 1 detects a blocking of communication with the second base station 3 and reports the detection result to the first base station 2; that is, the terminal 1 adds information on a detection result to a measurement result reporting massage (Measurement Report) and then transmits the measurement result reporting massage to the first base station 2, which in turn starts operations required for switching communication paths based on the information on the detection result contained in the measurement result reporting massage as explained above with reference to FIG. 15.

Fourth Embodiment

Figure 16:
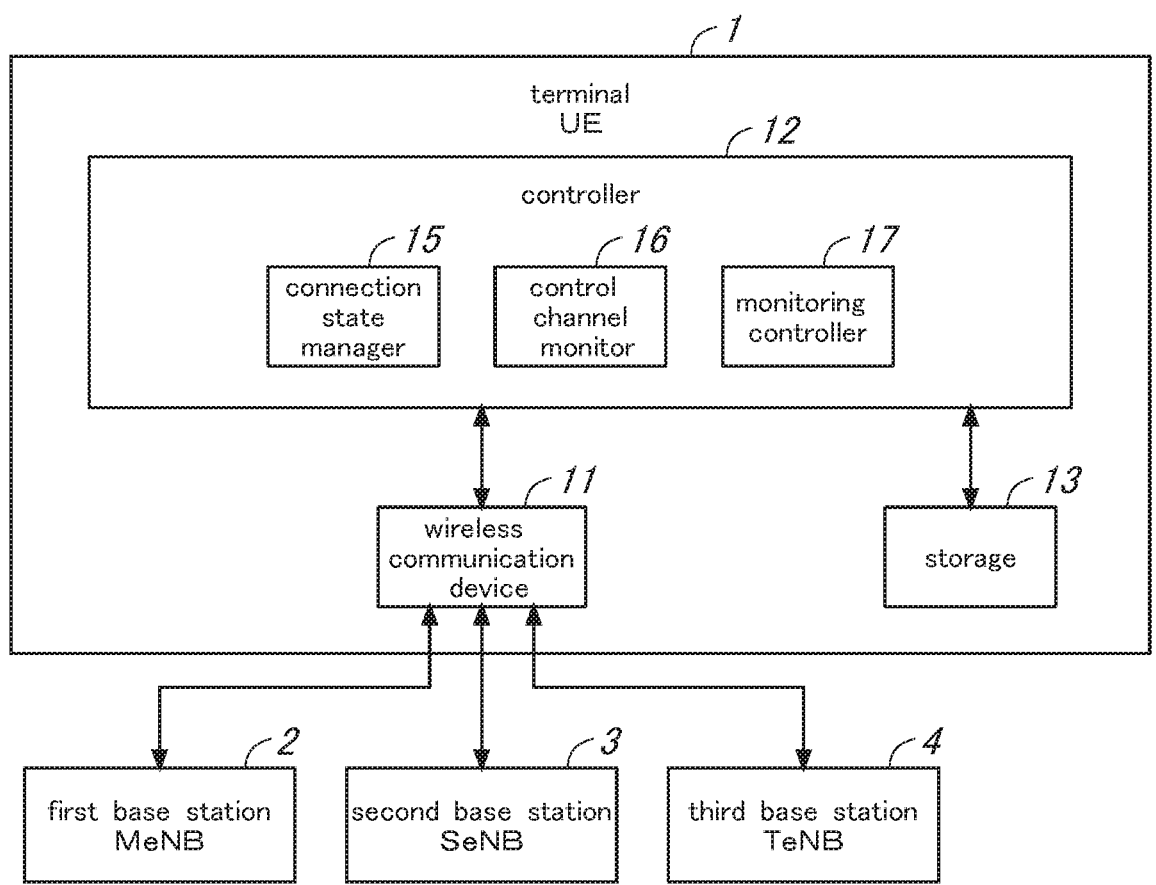
FIG. 16 is a block diagram showing a schematic configuration of a terminal 1 according to a fourth embodiment of the present invention.

Next, a fourth embodiment of the present invention will be described. Except for what will be discussed here, the configuration of the present embodiment is the same as that of the above-described embodiments. FIG. 16 is a block diagram showing a schematic configuration of a terminal 1 according to the fourth embodiment of the present invention. FIG. 17 is an explanatory view showing how the terminal 1 monitors communication channels according to the fourth embodiment of the present invention.

In the first embodiment (see FIG. 3), the terminal 1 is provided with the control channel monitor 16, which monitors control channels assigned to the base stations 2 to 4, respectively. In the fourth embodiment, the terminal 1 includes a monitoring controller 17, which is configured to control monitoring operations performed by the control channel monitor 16.

When forming initial connections (see FIG. 8) is completed, the control channel monitor 16 starts to monitor the control channels assigned to the base stations 2 to 4 used for communicating control data with the terminal 1. Since the terminal 1 is connected to three base stations 2 to 4 simultaneously, the control channel monitor needs to monitor multiple control channels. Under this condition, if the control channel monitor monitors the entire control channel region (all the control channels) related to the third base station 4 serving as a backup communication path all the time as shown in FIG. 17A, power consumption of the terminal 1 is increased.

However, the third base station 4 serves as a backup communication path used when communication between the second base station 3 and the terminal 1 is blocked: that is, the third base station 4 starts to communicate user data with the terminal only after quality of communication with the second base station 3 is decreased. In other words, when quality of communication with the second base station 3 is not decreased, the third base station does not communicate user data with the terminal. Therefore, the terminal 1 does not need to monitor all the control channels related to the third base station 4 serving as the backup communication path all the time.

In this view, in the fourth embodiment, after the connection with the third base station 4 serving as the backup communication path is established, the monitoring controller 17 controls the monitoring of a control channel(s) related to the third base station 4 according to the status of communication with the second base station 3 serving as the normal communication path.

Specifically, while quality of the communication with the second base station 3 is good, the monitoring controller does not monitor the control channels related to the third base station 4 because a backup communication path is not necessary. When quality of the communication with the second base station 3 is decreased, the monitoring controller monitors the control channels related to the third base station 4 because a backup communication path becomes necessary. More specifically, as shown in FIG. 17B, the monitoring controller controls the monitoring of control channels such that, initially, the entire control channel region related to the third base station 4 is set in a non-monitored state; that is, unmonitored, and when the terminal detects a blockage of communication with the second base station 3, the entire control channel region related to the third base station 4 is shifted to be in the monitored state; that is, all the contrail channels are monitored.

It should be noted that FIG. 17 only illustrates a schematic presentation of how the terminal controls the control channels in one embodiment, and that the number of channels and/or the arrangement of monitored state blocks along time axis in the figure may be changed as appropriate.

Fifth Embodiment

Next, a fifth embodiment of the present invention will be described. Except for what will be discussed here, the configuration of the present embodiment is the same as that of the above-described embodiments. FIG. 18 is an explanatory view showing how the terminal 1 monitors communication channels according to the fifth embodiment of the present invention.

In the fourth embodiment (see FIG. 17), when the terminal detects a blockage of communication with the second base station 3, all the control channels related to the third base station 4 serving as a backup communication path are shifted from the non-monitored state to the monitored state. In the fifth embodiment, as shown in FIG. 18A, a limited control channel region (i.e. at least one but not all the control channels) related to the third base station 4 serving as the backup communication path is initially monitored: that is, the backup control channel region is in a limited-monitored state.

The terminal 1 receives control channel data to the terminal itself while the control channel region related to the third base station 4 is set in the limited-monitored state. That is, when the terminal receives control data transmitted from the third base station 4, the entire control channel region related to the third base station 4 is shifted into the monitored state, in which all the related control channels are monitored.

When the communication path is switched from the second base station 3 serving as a normal communication path to the third base station 4 serving as a backup communication path so that the second base station 3 is shifted into a non-communication state (i.e. the non-monitored state), it is no longer necessary to monitor any control channel related to the second base station 3. In this view, in the fifth embodiment, when the communication path is switched from the second base station 3 to the third base station 4, the control channels related to the second base station 3 are shifted to be in the limited-monitored state, in which at least one but not all the control channels related to the second base station 3 is monitored as shown in FIG. 18B. As a result, power consumption at the terminal 1 is further reduced.

It should be noted that information on how the monitored control channel region is limited can be exchanged in advance between the second base station 3 and the third base stations 4 via the first base station 2 when forming initial connections. In this case, while the control channel region related to the second base station 3 is in the limited-monitored state, the first control data can be transmitted from the second or third base stations 3 and 4 to the terminal 1 through a designated control channel(s). This configuration ensures that control data can be transferred even when a control channel region to be monitored is limited.

The control channel region related to the third base station 4 serving as the backup communication path may be fixed to one or more prescribed channels (for example, the 0th to 10th resource blocks) as a part of system design specification. This configuration eliminates the need for advanced negotiations regarding the control channel region between the terminal 1 and the base stations 3 and 4 to be monitored. In this connection, in cases where the base stations 3 and 4 can differ in the frequencies of occurrence of a blockage and/or their frequencies of occurrence of a blockage can change depending on time of day, it is desirable that the control channel region to be monitored can be freely adjusted accordingly, and thus it is preferable to adopt the advanced negotiations regarding the control channel region to be monitored.

In this way, according to the fifth embodiment, the control channel region related to the third base station 4 serving as a backup communication path is set in the limited-monitored state, in which at least one but not all channels for backup communication is monitored, until the terminal 1 detects a blockage of communication with the second base station 3, whereby power consumption of the terminal 1 is reduced.

While the terminal 1 of the fourth embodiment cannot communicate control data with both the second and third base stations 3 and 4 at the same time, the terminal 1 of the fifth embodiment can communicate control data concurrently with both the second and third base stations 3 and 4 depending on conditions.

Sixth Embodiment

Figure 19:
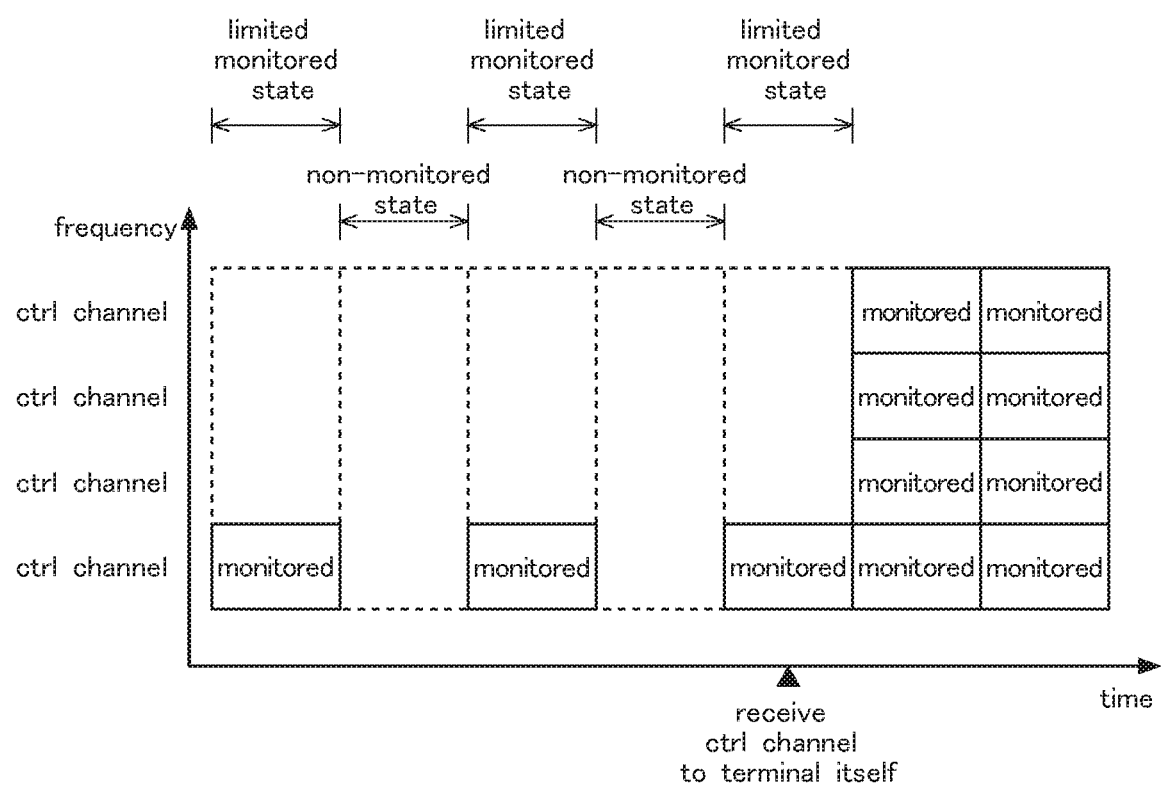
FIG. 19 is an explanatory view showing how the terminal 1 monitors communication channels according to a sixth embodiment of the present invention.

Next, a sixth embodiment of the present invention will be described. Except for what will be discussed here, the configuration of the present embodiment is the same as that of the above-described embodiments. FIG. 19 is an explanatory view showing how the terminal 1 monitors communication channels according to the sixth embodiment of the present invention.

In the fourth embodiment (see FIG. 17), the system is configured such that the entire control channel region related to the third base station 4 is in the non-monitored state until the terminal 1 detects a blockage of communication with the second base station 3, and in the fifth embodiment (see FIG. 18), the limited control channel region related to the third base station 4 is monitored until the terminal detects a blockage of communication. In the sixth embodiment, the control channel region to be monitored is controlled so as to repeatedly alternate two states; one is the limited-monitored state, in which at least one but not all control channels are monitored, and the other is the non-monitored state, in which all the control channels are not monitored. The limited-monitored state is same as the one in the fifth embodiment and the non-monitored state is same as the one in the fourth embodiment.

The terminal 1 receives control channel data to the terminal itself while the control channel region for the third base station 4 serving as the backup communication path is in the limited-monitored state. Thus, when the terminal receives control data transmitted from the third base station 4, the entire control channel region related to the third base station 4 is shifted into the monitored state, in which all the control channels related to the third base station 4 are monitored.

The time period (monitoring period) of switching between the limited-monitored state and the non-monitored state does not need to be adjusted so as to coordinate with a TTI (Transmission Time Interval), and may be set based on time required to switch communication paths. For example, when the time required to switch communication paths is 60 ms, the limited-monitored state and the non-monitored state may be switched at intervals of 30 ms. The information on the monitoring period may be exchanged in advance between the second and third base stations 3 and 4 via the first base station 2 when forming initial connections.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, in the above-described embodiments, the system is configured such that the first base station 2 which serves as the management device determines a main base station serving as a normal communication path and a backup base station serving as a backup communication path. However, a device functioning as a management device other than a base station may be disposed anywhere in a cellular communication network formed by multiple base stations.

Moreover, in the above-described embodiments, communication paths between a terminal and a base station are switched when a blockage of the communication path is detected. However, in some embodiments, the system may be configured such that, when quality of communication between a terminal and a base station is being decreased and the communication has not yet determined to be blocked, the system determines that switching communication paths is necessary and conducts the switching communication paths.

INDUSTRIAL APPLICABILITY

A wireless communication system, a management device, and a communication path switching method, which reduce power consumption and enable a quick change from one communication path to another upon detecting a decrease in quality of communication for communicating user data, and are useful as a wireless communication system for communicating user data between a terminal device and a superordinate network via base station devices configured for wireless communication with the terminal device, a management device for managing a terminal device and base station devices in the wireless communication system, and a communication path switching method in the wireless communication system.

GLOSSARY 1 terminal (terminal device)
2 first base station (base station device)
3 second base station (main base station device)
4 third base station (backup base station device)
11 wireless communication device
12 controller
15 connection state manager
16 control channel monitor
17 monitoring controller
21 wireless communication device
22 inter-base-station communication device
23 controller
31 wireless communication device
32 inter-base-station communication device
33 controller
41 wireless communication device
42 inter-base-station communication device
43 controller

The invention claimed is:

1. A wireless communication system for communicating user data between a terminal device and a superordinate network via base station devices configured for wireless communication with the terminal device, comprising:
   the terminal device;
   the base station devices including a main base station device which serves as a normal communication path for the user data, and a backup base station device which serves as a backup communication path for the user data;
   a management device configured to manage the terminal device and the base station devices;
   wherein the management device comprises:
      a management communication device configured to communicate with the terminal device and the base station devices; and a management controller configured to determine the main base station device and the backup base station device, and transmit a connection request message to the terminal device, the main base station device, and the backup base station device concurrently with transmitting a communication request message to the main base station device, wherein, upon receiving a path switching request message from the main base station device, the management controller transfers the received path switching request message to the backup base station device, wherein each of the base station devices comprises:
 a base station communication device configured to communicate with the terminal device and the management device; and
 a base station controller configured to control connection and communication with the terminal device in response to the connection request message and/or the communication request message transmitted from the management device, wherein, upon detecting a decrease in quality of communication with the terminal device, the base station controller transmits the path switching request message to the management device, and the terminal device comprises:
 a terminal communication device configured to communicate with the management device and the base station devices; and
 a terminal controller configured to control connection and communication with the base station devices in response to the connection request message transmitted from the management device.

2. The wireless communication system according to claim 1, wherein when the base station device serves as the main base station device and is in communication with the terminal device, the base station device detects the decrease in quality of communication based on a reception status of an uplink signal from the terminal device.

3. A wireless communication system for communicating user data between a terminal device and a superordinate network via base station devices configured for wireless communication with the terminal device, comprising:
 the terminal device;
 the base station devices including a main base station device which serves as a normal communication path for the user data, and a backup base station device which serves as a backup communication path for the user data;
 a management device configured to manage the terminal device and the base station devices;
wherein the management device comprises:
 a management communication device configured to communicate with the terminal device and the base station devices; and
 a management controller configured to determine the main base station device and the backup base station device, and transmit a connection request message to the terminal device, the main base station device, and the backup base station device concurrently with transmitting a communication request message to the main base station device, wherein, upon detecting a decrease in quality of communication with the terminal device, the management controller transmits a path switching request message to the backup base station device, wherein each of the base station devices comprises:
 a base station communication device configured to communicate with the terminal device and the management device; and
 a base station controller configured to control connection and communication with the terminal device in response to the connection request message and/or the communication request message transmitted from the management device, and wherein the terminal device comprises:
 a terminal communication device configured to communicate with the management device and the base station devices; and
 a terminal controller configured to control connection and communication with the base station devices in response to the connection request message transmitted from the management device.

4. The wireless communication system according to claim 3, wherein the terminal device is configured to, upon detecting the decrease in quality of communication with the main base station device while in communication with the main base station device, transmit a detection result to the management device, the detection result indicating the decrease in quality of communication, and
 wherein the management device detects the decrease in quality of communication based on the detection result transmitted from the terminal device.

5. The wireless communication system according to claim 1, wherein the management device is a base station device configured to form a macro cell in a control plane, and
 wherein the management device is a base station device configured to form a small cell in a user plane.

6. The wireless communication system according to claim 1, wherein the management controller of the management device is configured to choose, as the main base station device, a base station device adapted for wireless communications utilizing High-SHF band or EHF band, and choose, as the backup base station device, a base station device adapted for wireless communications utilizing Low-SHF band.

7. The wireless communication system according to claim 1, wherein the terminal controller of the terminal device is configured to, upon completion of establishing a connection with the backup base station device, stop monitoring an entire control channel region related to the backup base station device, and upon detecting the decrease in quality of communication with the main base station device, shift into a state in which the entire control channel region related to the backup base station device is monitored.

8. The wireless communication system according to claim 1, wherein the terminal controller of the terminal device is configured to, upon completion of establishing a connection with the backup base station device, monitor a portion of a control channel region related to the backup base station device, and upon receiving control data from the backup base station device, shift into a state in which an entire control channel region related to the backup base station device is monitored.

9. The wireless communication system according to claim 1, wherein the terminal controller of the terminal device is configured to, upon completion of establishing a connection with the backup base station device, control the connection with the backup base station device in such a manner as to repeatedly alternate a non-monitored state in which an entire control channel region is not monitored and a limited monitored state in which a portion of a control channel region related to the backup base station device is monitored at prescribed time periods, and upon receiving control data from the backup base station device, shift into a state in which the entire control channel region related to the backup base station device is monitored.

10. The wireless communication system according to claim 3, wherein the management device detects the decrease in quality of communication based on wireless communication quality information included in a message transmitted from the terminal device.

11. A management device for managing a terminal device and base station devices, each base station device being configuring for wireless communication with the terminal device and the management device, the management device comprising:
   a management communication device configured to communicate with the terminal device and the base station devices; and
   a management controller configured to determine, among the base station devices, a main base station device which serves as a normal communication path, and a backup base station device which serves as a backup communication path, and to transmit a connection request message to the terminal device, the main base station device, and the backup base station device concurrently with transmitting a communication request message to the main base station device, wherein the main base station device transmits a path switching request message when a decrease in quality of communication occurs, and wherein the management controller, upon receiving the path switching request message from the main base station device, transfers the received path switching request message to the backup base station device.

12. A communication path switching method for switching base station devices used for wireless communication with a terminal device, the method using a management device configured to manage the terminal device and the base station devices, the method comprising:
   the management device determining, among the base station devices, a main base station device which serves as a normal communication path, and a backup base station device which serves as a backup communication path; and
   the management device transmitting a connection request message to the terminal device, the main base station device, and the backup base station device concurrently with transmitting a communication request message to the main base station device;
   the main base station device and the backup base station device each completing establishment of a connection with the terminal device in response to the connection request message and/or the communication request message transmitted from the management device;
   the main base station device, upon detecting a decrease in quality of communication with the terminal device, transmitting a path switching request message to the management device; and
   the management device, upon receiving the path switching request message transmitted from the main base station device, transferring the received path switching request message to the backup base station device.

* * * * *